US012672113B2

(12) United States Patent
Farag et al.

(10) Patent No.: US 12,672,113 B2
(45) Date of Patent: Jun. 30, 2026

(54) ASSISTED SENSING FOR SIDELINK RESOURCE SELECTION

(71) Applicant: Samsung Electronics Co., Ltd., Suwon-si (KR)

(72) Inventors: Emad N. Farag, Flanders, NJ (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1175 days.

(21) Appl. No.: 17/224,983

(22) Filed: Apr. 7, 2021

(65) Prior Publication Data
US 2021/0337519 A1 Oct. 28, 2021

Related U.S. Application Data

(60) Provisional application No. 63/040,912, filed on Jun. 18, 2020, provisional application No. 63/014,031, filed on Apr. 22, 2020.

(51) Int. Cl.
*H04W 72/04* (2023.01)
*H04L 5/00* (2006.01)

(52) U.S. Cl.
CPC ........... *H04W 72/04* (2013.01); *H04L 5/0048* (2013.01); *H04L 5/0078* (2013.01)

(58) Field of Classification Search
CPC ... H04W 72/04; H04W 72/11; H04W 72/115; H04W 72/40; H04W 72/044; H04W 72/0446; H04W 72/0453; H04W 72/0457; H04W 72/046; H04W 72/0466; H04W 72/0473; H04W 16/00; H04W 36/06;
(Continued)

(56) References Cited

U.S. PATENT DOCUMENTS

2021/0329597 A1* 10/2021 Kwak ..................... H04W 4/40
2022/0312517 A1* 9/2022 Xu ......................... H04W 72/04
2023/0091084 A1* 3/2023 Miao .................... H04L 5/0055
370/277

FOREIGN PATENT DOCUMENTS

WO    2020/035142 A1    2/2020
WO    2020/064553 A1    4/2020

OTHER PUBLICATIONS

LG Electronics, "Discussion on resource allocation for Mode 2", 3GPP TSG RAN WG1 #99, Nov. 18-22, 2019, R1-1912588, 16 pages.
(Continued)

*Primary Examiner* — Brian T Le

(57) ABSTRACT

Methods and apparatuses for assisted sensing for sidelink resource selection. A first user equipment (UE) receives a physical sidelink (SL) control channel (PSCCH) or a physical SL shared channel (PSSCH) on a SL interface, performs a first sensing of the SL interface, determines first information for a first SL resource selection based at least on the first sensing, determines a first SL resource, multiplexes the first information in a first SL channel, and transmits the first SL channel in the first SL resource to a second UE. The second UE receives a first SL channel from a first UE on a first SL resource of a SL interface, determines an applicability of first information provided by the SL channel, selects a second SL resource based on the first information when the information is determined to be applicable, and transmits on the second SL resource.

20 Claims, 23 Drawing Sheets

(58) Field of Classification Search
CPC .......... H04W 72/12; H04B 7/024; H04L 5/00;
H04L 5/0048; H04L 5/005; H04L 5/0051;
H04L 5/0078; H04L 5/008; H04L 5/0085
See application file for complete search history.

(56) References Cited

OTHER PUBLICATIONS

Intel Corporation, "Summary for AI 7.2.4.2.2 Mode-2 Resource Allocation", 3GPP TSG RAN WG1 Meeting #96bis, Apr. 8-12, 2019, R1-1905717, 24 pages.
CATT, "Discussion on resource allocation mechanism for sidelink Mode 2 in NR V2X", 3GPP TSG RAN WG1 Meeting #96bis, Apr. 8-12, 2019, R1-1905353, 10 pages.
International Search Report dated Jul. 26, 2021 in connection with International Patent Application No. PCT/KR2021/004791, 3 pages.
"3rd Generation Partnership Project; Technical Specification Group Radio Access Network; NR; Physical channels and modulation (Release 16)", 3GPP TS 38.211 v16.4.0, Dec. 2020, 133 pages.
"3rd Generation Partnership Project; Technical Specification Group Radio Access Network; NR; Multiplexing and channel coding (Release 16)", 3GPP TS 38.212 v16.4.0, Dec. 2020, 152 pages.
"3rd Generation Partnership Project; Technical Specification Group Radio Access Network; NR; Physical layer procedures for control (Release 16)", 3GPP TS 38.213 v16.4.0, Dec. 2020, 181 pages.
"3rd Generation Partnership Project; Technical Specification Group Radio Access Network; NR; Physical layer procedures for data (Release 16)", 3GPP TS 38.214 v16.4.0, Dec. 2020, 169 pages.
"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pages.
"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.
LG Electronics, "New WID on NR sidelink enhancement ", 3GPP TSG RAN Meeting #86, RP-193231, Dec. 2019, 6 pages.
Extended European Search Report issued Jul. 11, 2023 regarding Application No. 21792884.5, 11 pages.
Huawei et al., "Sidelink resource allocation mode 2", 3GPP TSG RAN WGI Meeting #95, R1-1812209, Nov. 2018, 14 pages.

* cited by examiner

RSAI: Resource Selection Assistance Information

Slot m: Slot including resource of initial HARQ transmission of RSAI
Slot n: RSAI determination in controlling UE RSAI: Resource Selection Assistance Information Slot n: RSAI determination in controlling UE Slot m: RSAI transmission from controlling UE of (initial HARQ transmission)

Slot k: First slot of candidate resource window of RSAI

Slot s: First slot of sensing window for RSAI

2000

Candidate window for RSAI transmission resources

Candidate window of RSAI

Sensing window for RSAI Transmission Resources

Sensing window for RSAI p n t

T$_{ts}$

Slot n: RSAI determination in controlling UE
Slot p: Determination of subset of candidate resources for RSAI transmissions
Slot t: Aperiodic trigger of RSAI to a controlling UE Slot n: RSAI determination in controlling UE
Slot p: Determination of subset of candidate resources for RSAI transmissions
Slot t: Aperiodic trigger of RSAI to a controlling UE

2200

Determine slot m by:
(Pre-)configuration
Resource Alloc Mode 2
Resource Alloc Mode 1
~2202

Determine slot n
~2204

Determine RSAI in slot n by:
1. Processing sensing results from "sensing window for RSAI"
2. If applicable: Determining candidate resources in "Candidate window of RSIA"
~2206

Transmit RSAI in slot m
~2208

2300

Determine slot m by:
(Pre-)configuration
Resource Alloc Mode 2
Resource Alloc Mode 1 — 2302

Determine RSAI based on slot m by:
1. Processing sensing results from "sensing window for RSAI"
2. If applicable: Determining candidate resources in "Candidate window of RSIA" — 2304

Transmit RSAI in slot m — 2306

2500

ASSISTED SENSING FOR SIDELINK RESOURCE SELECTION

CROSS-REFERENCE TO RELATED APPLICATION AND CLAIM OF PRIORITY

This application claims priority under 35 U.S.C. § 119(e) to U.S. Provisional Patent Application No. 63/014,031 filed on Apr. 22, 2020 and U.S. Provisional Patent Application No. 63/040,912 filed on Jun. 18, 2020. The above-identified provisional patent applications are hereby incorporated by reference in their entirety.

TECHNICAL FIELD

The present disclosure relates generally to wireless communication systems and, more specifically, the present disclosure relates to assisted sensing for sidelink resource selection.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to assisted sensing for sidelink resource selection.

In one embodiment, a user equipment (UE) is provided. The UE includes a transceiver configured to receive a physical sidelink (SL) control channel (PSCCH) or a physical SL shared channel (PSSCH) on a SL interface. The UE further includes a processor operably connected to the transceiver. The processor is configured to perform a first sensing of the SL interface, determine first information for a first SL resource selection based at least on the first sensing, and determine a first SL resource. The transceiver is further configured to multiplex the first information in a first SL channel and transmit the first SL channel in the first SL resource to a second UE.

In another embodiment, a UE is provided. The UE includes a transceiver configured to receive a first SL channel from a first UE on a first SL resource of a SL interface. The UE further includes a processor operably connected to the transceiver. The processor is configured to determine an applicability of first information provided by the first SL channel; and select a second SL resource based on the first information when the information is determined to be applicable. The transceiver is further configured to transmit on the second SL resource.

In yet another embodiment, a method of operating a UE is provided. The method includes receiving a first SL channel from a first UE on a first SL resource of a SL interface and determining an applicability of first information provided by the first SL channel. The method further includes selecting a second SL resource based on the first information when the first information is determined to be applicable and transmitting a second SL channel on the second SL resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" 3GPP TS 38.212 v16.4.0, "NR; Multiplexing and Channel coding," 3GPP TS 38.213 v16.4.0, "NR; Physical Layer Procedures for Control," 3GPP TS 38.214 v16.4.0, "NR; Physical Layer Procedures for Data," 3GPP TS 38.321 v16.3.0, "NR; Medium Access Control (MAC) protocol specification," 3GPP TS 38.331 v16.3.1, "NR; Radio Resource Control (RRC) Protocol Specification," 3GPP TS 36.213 v16.4.0, "Evolved Universal Terrestrial Radio Access (E-UTRA); Physical layer procedures," and RP-201385, "NR Sidelink enhancement", LG Electronics, e-meeting July 2020.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
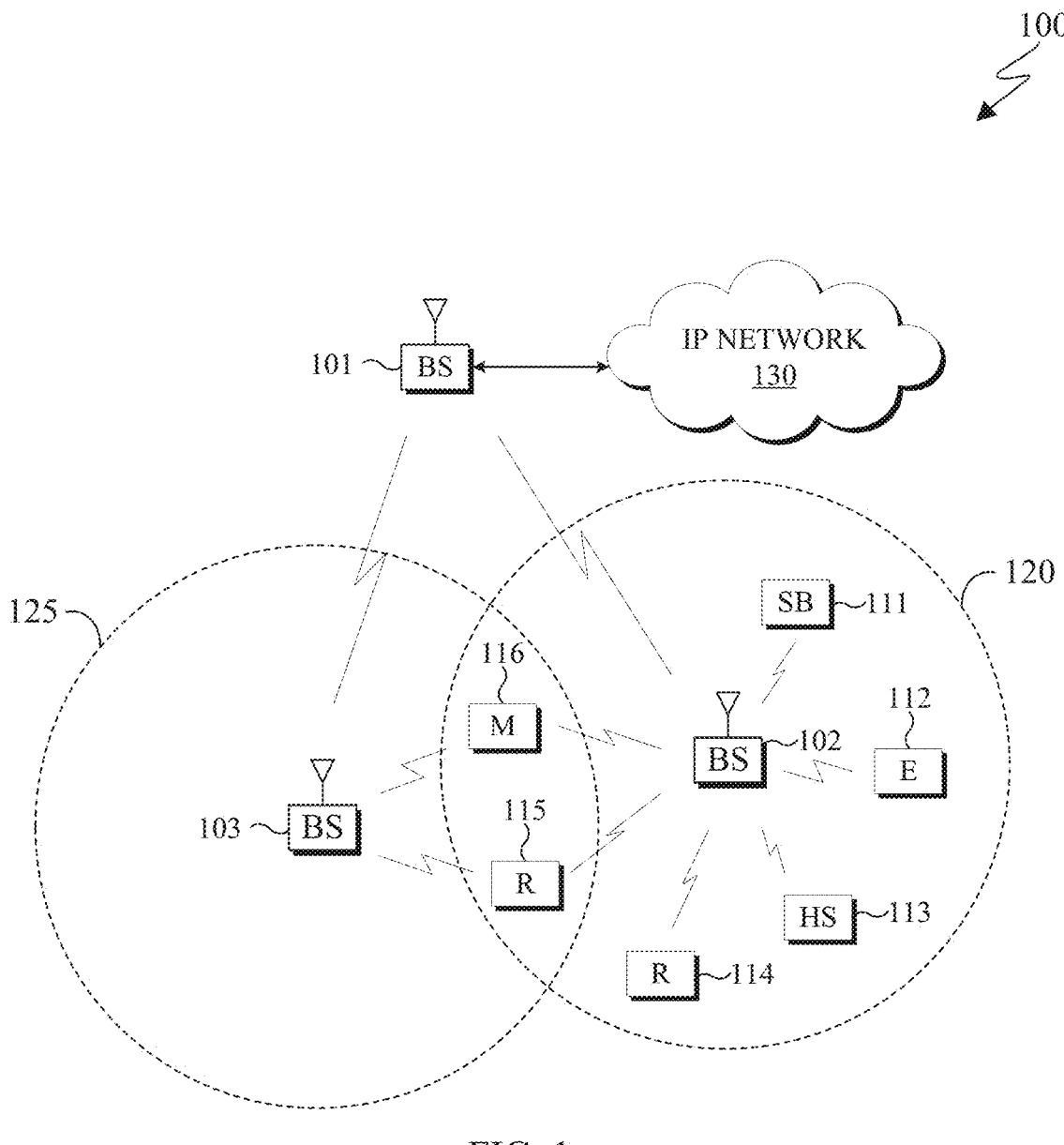
FIG. 1 illustrates an example wireless network according to embodiments of the present disclosure.
Figure 2:
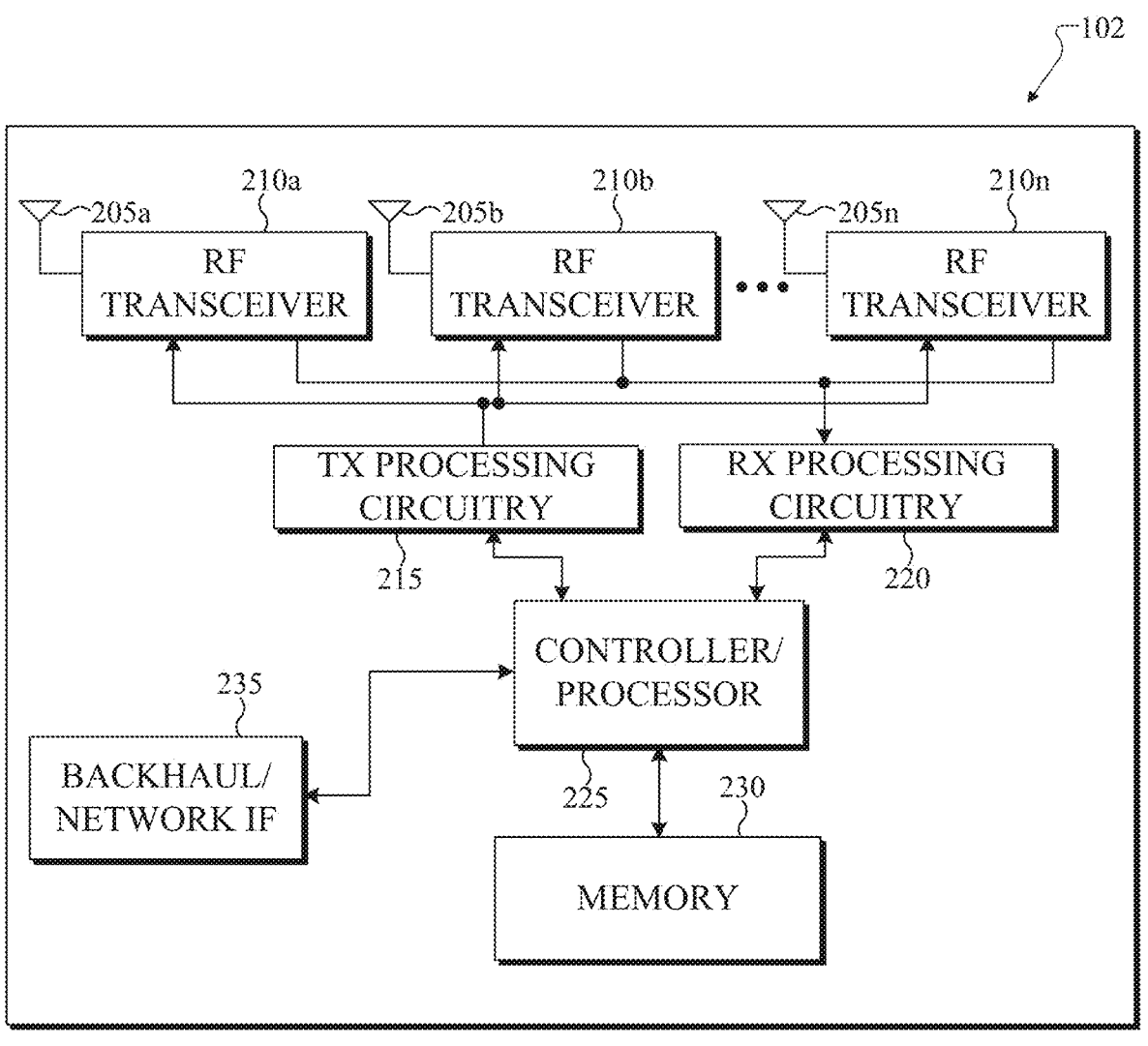
FIG. 2 illustrates an example gNB according to embodiments of the present disclosure.
Figure 3:
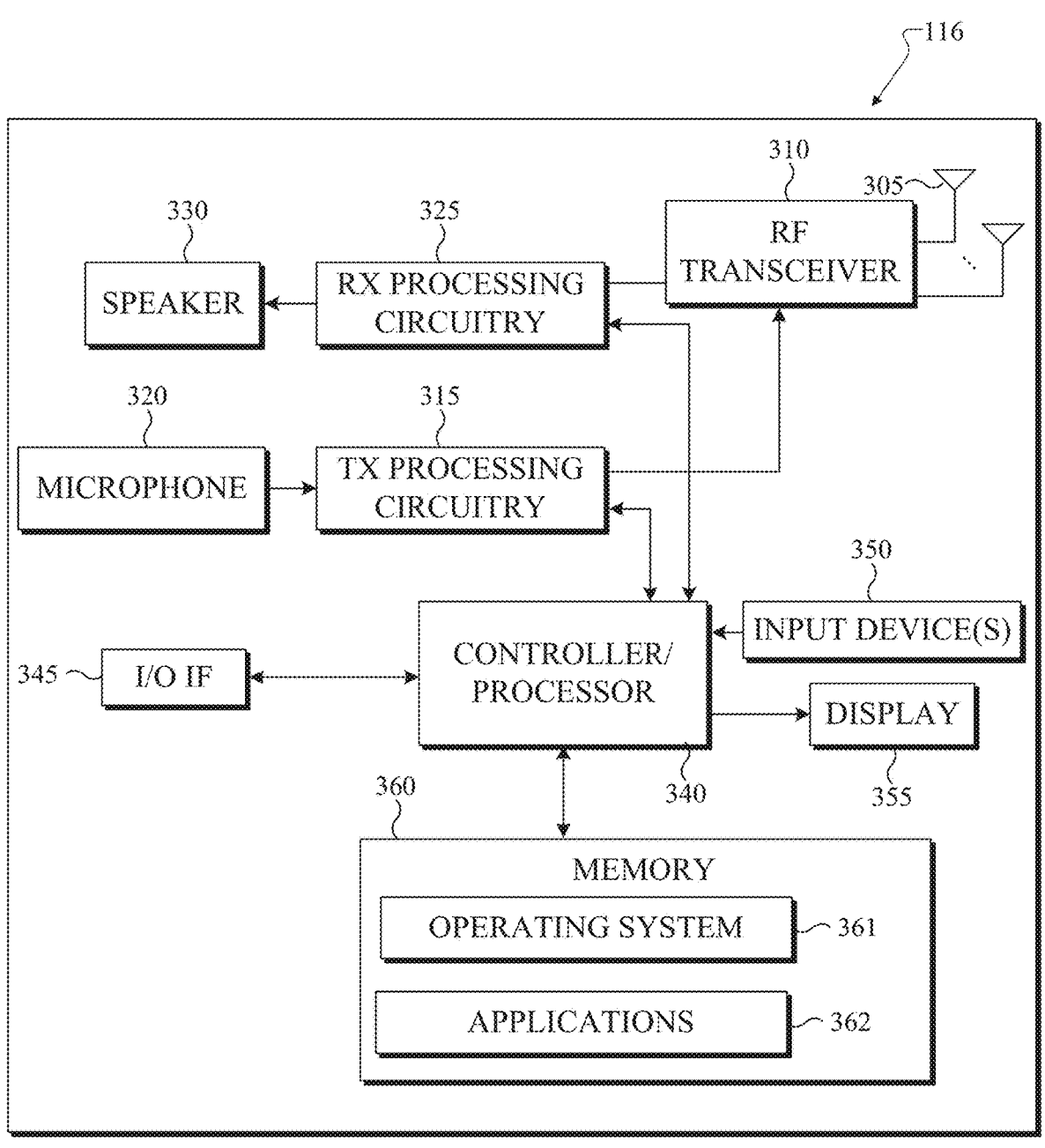
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipment's (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine). For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for assisted sensing for sidelink resource selection. In certain embodiments, and one or more of the gNBs 101-103 includes circuitry, programming, or a combination thereof for assisted sensing for sidelink resource selection.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support assisted sensing for sidelink resource selection. Any of a wide variety of other functions could be supported in the gNB 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 is also capable of supporting channel quality measurements and reporting for systems have two dimensional (2D) antenna arrays. In certain embodiments, the controller/processor 225 supports communication between entities, such as web real time communications (RTC). The controller/processor 225 can move data into or out of memory 230 according to a process that is being executed.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory. The plurality of instructions are configured to cause the controller/processor 225 to perform the BIS process and to decode a received signal after subtracting out at least one interfering signal determined by the BIS algorithm.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
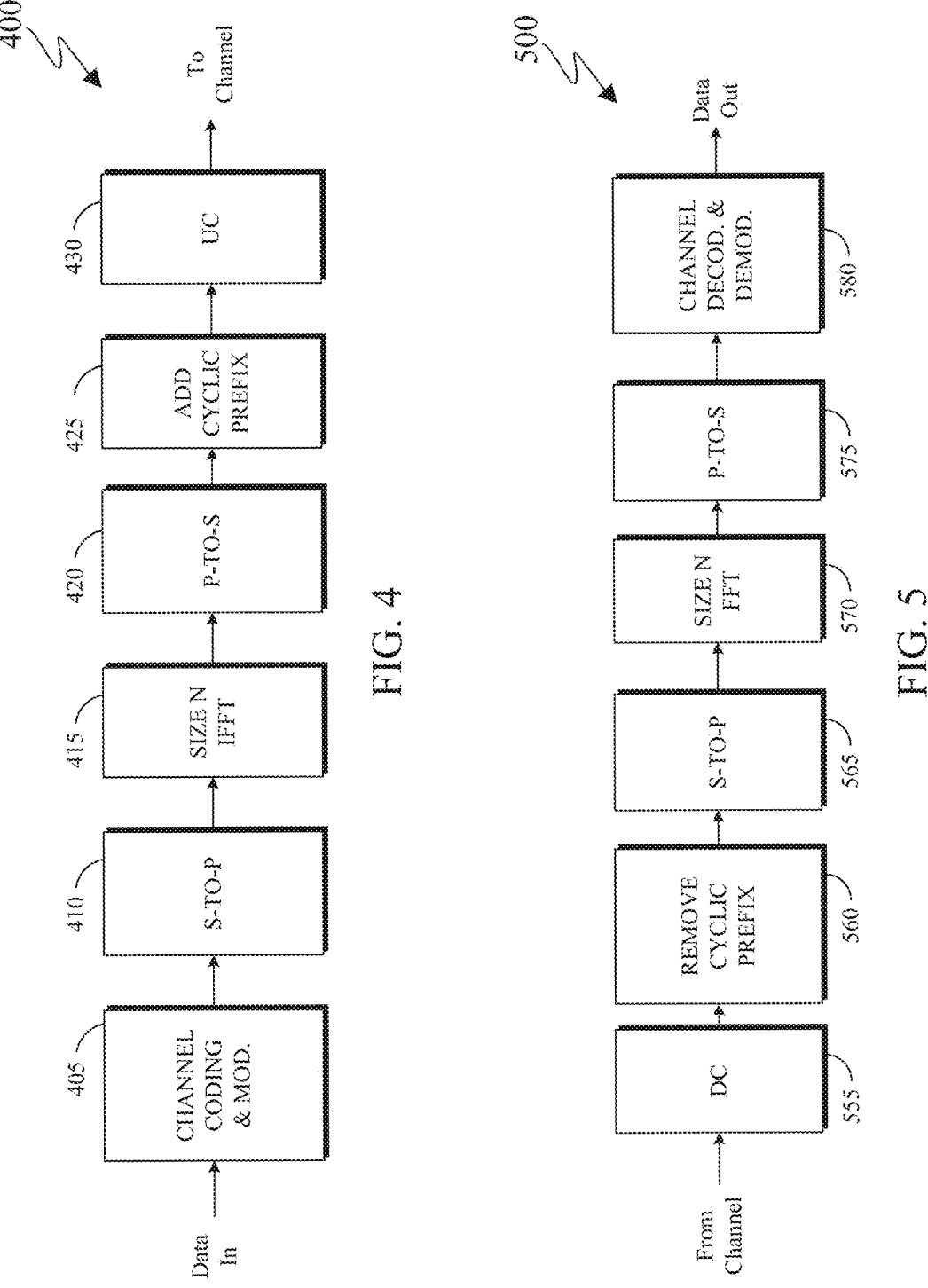
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. In various embodiments, the receive path 500 may be implemented in a first UE while the transmit path 400 is implemented in a second UE and vice versa. In some embodiments, the receive path 500 is configured to support assisted sensing for sidelink resource selection as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 or in the sidelink to others of the UEs 111-116 and may implement the receive path 500 for receiving in the downlink from the gNBs 101-103 or in the sidelink to others of the UEs 111-116.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

According to embodiments of the present disclosure, a time unit for downlink (DL) signaling, uplink (UL) signaling, or sidelink (SL) signaling is referred to as a slot and can include one or more symbols. A symbol belongs to a slot that includes a number of symbols such as 14 symbols. A slot can also be used as a time unit. A bandwidth (BW) unit is referred to as a resource block (RB). One RB includes a number of sub-carriers (SCs).

For example, a slot can have duration of one millisecond and an RB can have a bandwidth of 180 kHz and include 12 SCs with inter-SC spacing of 15 kHz. For another example, a slot can have a duration of 0.25 milliseconds and include 14 symbols and an RB can have a BW of 720 kHz and include 12 SCs with SC spacing of 60 kHz.

An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE, such as the UE 116, can be configured with one or more bandwidth parts (BWPs) of a system BW for transmissions or receptions of signals or channels.

SL signals and channels are transmitted and received on sub-channels within a resource pool. A resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

In certain embodiments, a SL channel operates in different cast modes, such as a unicast mode, groupcast mode, and a broadcast mode. In a unicast mode, a PSCCH/PSSCH conveys SL information from one UE to only one other UE. In a groupcast mode, a PSCCH/PSSCH conveys SL information from one UE to a group of UEs within a (pre-) configured set. In a broadcast mode, a PSCCH/PSSCH conveys SL information from one UE to all surrounding UEs.

In certain embodiments, there are two resource allocation modes for a PSCCH/PSSCH transmission. In resource allocation mode 1, a gNB, such as BS 102, schedules a UE, such as UE 116, on the SL and conveys scheduling information to the UE transmitting on the SL through a DCI format. In resource allocation mode 2, a UE schedules a SL transmission.

SL transmissions can operate within network coverage, where each UE is within the communication range of a gNB. SL transmissions can also operate outside network coverage, where all UEs have no communication with any gNB, or with partial network coverage. Additionally, SL transmissions can operate where only some UEs are within the communication range of a gNB.

In certain embodiments, in case of groupcast PSCCH/PSSCH transmission, a network can configure a UE (such as the UE 116) via different reporting options for reporting of HARQ-ACK information by the UE:

In a first HARQ-ACK reporting option: A UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

In a second HARQ-ACK reporting option: A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

It is noted that in the first HARQ-ACK reporting option, when a UE that transmitted the PSSCH detects a NACK in a PSFCH reception, the UE can transmit another PSSCH with the TB (retransmission of the TB). However, in the second HARQ-ACK reporting option, when a UE that transmitted the PSSCH does not detect an ACK in a PSFCH reception, such as when the UE detects a NACK or does not detect a PSFCH reception, the UE can transmit another PSSCH with the TB.

A sidelink resource pool can include a set/pool of slots and a set/pool of RBs used for sidelink transmission and sidelink reception. A set of slots which can belong to a sidelink resource pool can be denoted by $$\{ t_0^{SL}, t_1^{SL}, t_2^{SL}, \dots \}.$$

A set of slots which belong to a resource pool can be denoted by $$\left\{ t_0'^{SL}, t_1'^{SL}, t_2'^{SL}, \dots, t_{T'_{MAX}-1}'^{SL} \right\}$$

and can be configured, for example, at least using a bitmap. Wherein, $T'_{MAX}$ is the number of SL slots in a resource pool. Within each slot $$t_y'^{SL}$$

of a sidelink resource pool, there are $N_{subCH}$ contiguous sub-channels in the frequency domain for sidelink transmission. The $N_{subCH}$ is provided by a higher-layer parameter. Subchannel m, where m is between 0 and $N_{subCH}-1$, is given by a set of $n_{subCHsize}$ contiguous PRBs, given by Equation (1), below. In Equation (1), $j=0, 1, \dots, n_{subCHsize}-1$, $n_{subCHstart}$ and $n_{subCHsize}$ are provided by higher layer parameters.

$$n_{PRB} = n_{subCHstart} + m \cdot n_{subCHsize} + j \qquad (1)$$

The slots of a SL resource pool are determined as follows:
1. Let a set of slots that may belong to a resource be denoted by $$\left\{ t_0^{SL}, t_1^{SL}, t_2^{SL}, \dots, t_{T_{MAX}-1}^{SL} \right\},$$

where $0 \le t_i^{SL} < 10240$, and $0 \le i < T_{max}$.

The slot index is relative to slot #0 of SFN #0 of the serving cell, or Direct Frame Number #0 (DFN #0). The set of slots includes all slots except:
   a. $N_{S\text{-}SSB}$ slots that are configured for SL SS/PBCH Block (S-SSB).
   b. $N_{nonSL}$ slots where at least one SL symbols is not-semi-statically configured as UL symbol by higher layer parameter tdd-UL-DL-Configuration-Common or sl-TDD-Configuration. In SL slots, OFDM symbols Y-th, (Y+1)-th, . . . , (Y+X−1)-th are SL symbols, where Y is determined by the higher layer parameter sl-StartSymbol and X is determined by higher layer parameter sl-LengthSymbols.
   c. $N_{reserved}$ reserved slots. Reserved slots are determined such that the slots in the set $$\left\{ t_0^{SL}, t_1^{SL}, t_2^{SL}, \ldots, t_{T_{MAX}-1}^{SL} \right\}$$

is a multiple of the bitmap length ($L_{bitmap}$), where the bitmap ($b_0, b_1, \ldots, b_{L_{bitmap}-1}$) is configured by higher layers. The reserved bits are determined as follows:

i. Let $\{l_0, l_1, \ldots, l_{2^\mu \times 10240-N_{S\text{-}SSB}-N_{nonSL}-1}\}$ be the set of slots in range $0 \ldots 2^\mu \times 10240-1$, excluding S-SSB slots and non-SL slots. The slots are arranged in ascending order of the slot index.

ii. The number of reserved slots is given by: $N_{reserved} = (2^\mu \times 10240-N_{S\text{-}SSB}-N_{nonSL})$ mod $L_{bitmap}$.

iii. The reserved slots $l_r$ are given by:

$$r = \left\lfloor \frac{m \cdot (2^\mu \times 10240 - N_{S\text{-}SSB} - N_{nonSL})}{N_{reserved}} \right\rfloor,$$

where, $m=0, 1, \ldots, N_{reserved}-1$ $T_{max}$ is given by: $T_{max} = 2^\mu \times 10240-N_{S\text{-}SSB}-N_{nonSL}-N_{reserved}$.

2. The slots are arranged in ascending order of slot index.

3. The set of slots belonging to the SL resource pool, $$\left\{ t_0'^{SL}, t_1'^{SL}, t_2'^{SL}, \ldots, t_{T'_{MAX}-1}'^{SL} \right\},$$

are determined as follows:

a. Each resource pool has a corresponding bitmap ($b_0, b_1, \ldots, b_{L_{bitmap}-1}$) of length $L_{bitmap}$.

b. A slot $$t_k^{SL}$$

belongs to the bitmap if $b_{k \bmod L_{bitmap}} = 1$ c. The remaining slots are indexed successively staring from $0, 1, \ldots T'_{MAX}-1$. Where, $T'_{MAX}$ is the number of remaining slots in the set.

Slots can be numbered (indexed) as physical slots or logical slots, wherein physical slots, include all slots numbered sequential, while logical slots include only slots that belong to a sidelink resource pool as described above numbered sequentially. The conversion from a physical duration, $P_{rsvp}$, in milli-second to a logical slots, $$P_{rsvp}',$$

is given by $$P_{rsvp}' = \left\lceil \frac{T_{max}'}{10240 \text{ ms}} \times P_{rsvp} \right\rceil.$$

For resource (re-)selection or re-evaluation in slot n, a UE, such as the UE 116, can determine a set of available single-slot resources, also referred to as SL resources, for transmission within a resource selection window [n+T₁, n+T₂], such that a single-slot resource for transmission, $R_{x,y}$, is defined as a set of $L_{subcH}$ contiguous subchannels x+i, where $i=0, 1, \ldots, L_{subcH}-1$ in slot $$t_y'^{SL}.$$

It is noted that, $T_1$ is determined by the UE such that, $0 \le T_1 \le T_{proc,1}$, where $T_{proc,1}$ is a PSSCH processing time for example. Additionally, $T_2$ is determined by the UE such that $T_{2min} \le T_2 \le$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

According to embodiments of the present disclosure, the resource (re-)selection is a two-step procedure. The first step identifies the candidate resources within a resource selection window. Candidate resources are resources that belong to a resource pool, but exclude resources that were previously reserved, or potentially reserved by other UEs. The resources excluded are based on SCIs decoded in a sensing window and for which the UE measures a SL Reference Signal Received Power (RSRP) that exceeds a threshold. The threshold depends on the priority indicated in a SCI format and on the priority of the SL transmission. The resources excluded are based on reserved transmissions or semi-persistent transmissions that can collide with the excluded resources or any of reserved or semi-persistent transmissions. The second step selects or re-selects a resource from the identified candidate resources.

As described above, the first step of the resource (re-) selection two step procedure, identifies the candidate resources within a resource selection window. During this step, a UE can monitor slots in a sensing window [n−T₀, n−T_{proc,0}). Sensing refers to monitoring the SL interface during the sensing window and decoding the PSCCH. For example, the UE monitors slots belonging to a corresponding sidelink resource pool that are not used for the UE's own transmission. To determine a candidate single-slot resource set to report to higher layers, a UE excludes from the set of available single-slot resources for SL transmission within a resource pool and within a resource selection window, the following.

First, a single slot resource $R_{x,y}$, such that for any slot $$t_m'^{SL}$$

not monitored within the sensing window with a hypothetical received SCI Format 1-A, with a "Resource reservation period" set to any periodicity value allowed by a higher layer parameter sl-ResourceReservePeriodList and indicating all sub-channels of the resource pool in this slot, satisfies the condition 2.2. below.

Second, a single slot resource $R_{x,y}$, such that for any received SCI within the sensing window. The associated L1-RSRP measurement is above a (pre-)configured SL-RSRP threshold, where the SL-RSRP threshold depends on the priority indicated in the received SCI and that of the SL transmission for which resources are being selected. The condition 2.2 describes that the received SCI in slot $$t_m'^{SL},$$

or if "Resource reservation field" is present in the received SCI the same SCI is assumed to be received in slot $$t'^{SL}_{m+q\times P'_{rsvp\_Rx}},$$

indicates a set of resource blocks that overlaps $$R_{x,y+j\times P'_{rsvp\_Tx}}.$$

Where, $j=0, 1, \ldots, C_{resel}-1$, $P_{rsvp\_RX}$ is the indicated resource reservation period in the received SCI in physical slots, and $$P'_{rsvp\_Rx}$$

is that value converted to logical slots, $P'_{rsvp\_Tx}$ is the resource reservation period of the SL transmissions for which resources are being reserved in logical slots, and $q=1, 2, \ldots, Q$.

If $P_{rsvp\_RX} \leq T_{scal}$ and $n'-m < P'_{rsvp\_Rx}$, then $Q = \left\lceil \dfrac{T_{scal}}{P_{rsvp\_RX}} \right\rceil$, $T_{scal}$ is $T_2$ in units of milli-seconds, else Q=1. It is noted that $T_{scal}$ is $T_2$ in units of milliseconds. Additionally, if n belongs to $$(t'^{SL}_0, t'^{SL}_1, \ldots, t'^{SL}_{Tmax}),$$

then n'=n, else n' is the first slot after slot n belonging to set $$(t'^{SL}_0, t'^{SL}_1, \ldots, t'^{SL}_{Tmax}).$$

Third, if the candidate resources are less than a predetermined or (pre-)configured percentage (such as 20%) of the total available resources within the resource selection window, the (pre-)configured SL-RSRP thresholds are increased by a predetermined amount (such as 3 dB).

NR SL introduced two new procedures for mode 2 resource allocation; re-evaluation and pre-emption. Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot $m-T_3$. The re-evaluation check includes:

Performing the first step of the SL resource selection procedure [38.214 section 8.1.4], which involves identifying a candidate (available) sidelink resource set in a resource selection window as previously described.

If the pre-selected resource is available in the candidate sidelink resource set, the resource is used/signaled for sidelink transmission.

Else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$. The pre-emption check includes:

Performing the first step of the SL resource selection procedure [38.214 section 8.1.4], which involves identifying candidate (available) sidelink resource set in a resource selection window as previously described.

If the pre-selected and reserved resource is available in the candidate sidelink resource set, the resource is used/signaled for sidelink transmission.

Else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the SL resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority.

Else, the resource is used/signaled for sidelink transmission.

As described above, the monitoring procedure for resource (re)selection during the sensing window uses reception and decoding of a SCI format during the sensing window. This reception and decoding process can increase a processing complexity and power consumption of a UE for sidelink communication and requires the UE to have receive circuitry on the SL for sensing even if the UE only transmits and does not receive on the sidelink.

Embodiments of the present disclosure take into consideration that the 3GPP Release 16 (Rel-16) was the first NR release to include sidelink through work item "5G V2X with NR sidelink", the mechanisms introduced focused mainly on vehicle-to-everything (V2X) and can be used for public safety when the service requirement can be met. Release 17 (Rel-17) extends sidelink support to more use cases through work item "NR Sidelink enhancement" (RP-201385). Embodiments of the present disclosure provide sidelink enhancements such as in power saving. For example, power saving can enable UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

Embodiments of the present disclosure describe how sidelink uses resource allocation enhancements that reduce power consumption, using LTE sidelink random resource selection and partial sensing as baseline with potential enhancements. For example, resource allocation enhancement can specify resource allocation to reduce power consumption of the UEs. In certain embodiments a baseline introduces LTE sidelink random resource selection and partial sensing to sidelink resource allocation mode 2. It is noted that the baseline does not preclude introducing a new solution to reduce power consumption for the cases where the baseline cannot work properly.

With respect to resource allocation mode 2, a set of resources can be determined at UE_A and sent to UE_B, where UE_B takes this into account for its own transmission.

In some instances, the UE transmitting sidelink information (e.g. UE-B) is not aware of the sidelink environment at the UE receiving the sidelink information (UE-A), without receiving sidelink resource selection assistance information (i.e. inter-UE co-ordination information) from UE-A. For example, the hidden node problem is when a third UE or node is causing interference or is attempting to transmit to UE-A at the same time that UE-B is attempting to transmit to UE-A, but is not discerned by UE-B. When UE-A provides resource selection assistance information to UE-B, it can assist UE-B in making resource allocation decisions that avoid the hidden node problem when transmitting to UE-A. In another example, the exposed node problem is when a sidelink resource is being sensed as occupied at UE-B, i.e. the UE transmitting the sidelink information, but is not being sensed as occupied at UE-A, i.e. the UE receiving the sidelink information. If UE-B were to only use its sensing information it would not transmit on the resource to UE-A. However, if UE-B gets resource selection assistance information from UE-A, UE-B can allocate the resource for sidelink transmission to UE-A.

To alleviate the issues associated with sensing, various schemes have been proposed, such as random resource selection and partial sensing have been considered in LTE for sidelink transmission. With a random resource selection, a UE randomly selects a resource for sidelink transmission within the total available resources of a resource pool within a resource selection window. However, with random resource selection, there is no control on which resource is selected by a UE within the total available resources and this absence of control can lead to a higher resource collision rate and increased failures on the sidelink interface. A resource is defined by a set of time resources, such as symbols of a slot or slots, and a set of frequency resources such as a number of RBs of sub-channels. A collision on a resource over the time-frequency domain occurs when two or more UEs transmit on the resource. In certain embodiments, to alleviate collision by restricting the resources, a user selects for transmission based on a characteristic such as a user identity, a user location or a data priority. Alternatively, partial sensing can reduce the computation complexity by reducing the number of sensed slots during a sensing window, however, there is a tradeoff between sensing accuracy and computation complexity. With more slots sensed during a sensing window, the sensing accuracy is improved, and hence less likelihood of collision on a selected single slot resource within a resource selection window. However, the computation complexity is higher and hence higher power consumption by the UE. On the other hand, with less slots sensed during a sensing window, the computation complexity is reduced, and hence less power consumption at the expense of a deterioration of the sensing accuracy and hence a greater likelihood of collision on a selected single slot resource within a resource selection window.

In some scenarios, such as vulnerable road users (VRU) and pedestrian UEs (PUE), a low-cost, low-complexity, and low-power terminal is desirable. In one example, the terminal might be just transmitting its location and/or motion information to surrounding UEs, within a communication range, to alert other UEs of the presence of the VRU. To avoid collision with other users, it would be desirable that the selected resource does not collide with other sidelink transmissions. As described earlier, a user senses the sidelink during a sensing window to avoid sidelink resources used by other users when selecting its own sidelink resources for transmission. Sensing increases the UE's power consumption and hence would not be suitable for UEs with limited battery energy such as VRUs and PUEs. Other schemes with no sensing such as random selection and with partial sensing would lead to a loss in performance due to a higher collision rate on the selected resources for sidelink transmission. However, if a user with limited energy were to receive sensing information from other UEs that have no power restriction, for example such UEs can be a road side unit (RSU) or a vehicular UE, that have a larger power supply, the low energy UE can exploit this information when making its decision to select a sidelink resource for its transmission.

Embodiments of this disclosure provides methods for assisted resource selection for sidelink transmissions that mitigate and reduce a probability of resource collisions among UEs. That is, a UE can receive information related to sidelink sensing from other UEs in its vicinity, the information received assists the UE in selecting sidelink resources for its sidelink transmission and minimizes the probability of collision with other sidelink transmissions.

Embodiment of the present disclosure provide systems and methods for a UE to provide provides its sensing information (resource selection assistance information) to other UEs in its vicinity. Embodiment of the present disclosure also provide systems and methods for a UE to receive sensing information (resource selection assistance information) from other UEs in its vicinity to perform sidelink resource selection without having to perform its own sensing. Embodiment of the present disclosure further provide systems and methods for signaling and procedure aspects associated with the above two points, that of a UE providing its sensing information to other UEs and a UE receiving sensing information from other UEs. Additionally, embodiment of the present disclosure provide systems and methods for resource selection assistance information that can be conveyed through a gNB.

Embodiments of the present disclosure also provide methods for assisting resource selection for sideline transmissions for reducing a probability of resource collusions among UEs. For example, a UE can receive information related to sideline sensing from other UEs in its vicinity, the information received assist the UE in selecting sideline resources for its sidelink transmission for minimizing the probability of collisions with other sidelink transmissions. For example, embodiments of the disclosure specify timing aspects for sending resource selection assistance information/sensing information from a UE. The resources used for transmission of resource selection assistance information can be (pre-)configured, scheduled by a gNB/eNB or determined following the sidelink resource selection procedures. This information can be transmitted in a periodic, semi-persistent or aperiodic manner. Furthermore, embodiments of the disclosure related to timing parameters and procedures for determining and transmitting the resource selection assistance information.

Resource Selection Assistance Information on Sidelink (Component 1)

Figure 6:
FIG. 6 illustrates a sidelink network according to embodiments of the present disclosure.
Figure 6:
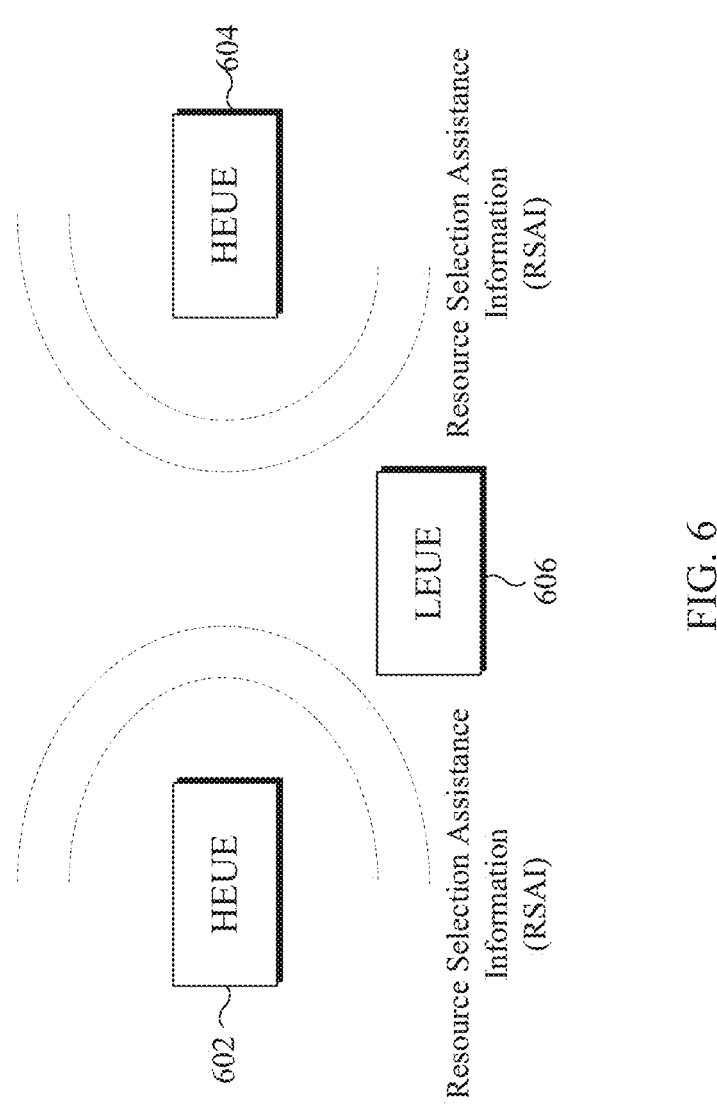

FIG. 6 illustrates an example sidelink network 600 according to embodiments of the present disclosure. The example sidelink network 600 of FIG. 6 is for illustration only and other embodiments can be used without departing from the scope of the present disclosure.

As illustrated in FIG. 6, the example sidelink network 600 includes high energy UEs (HEUE) (e.g. 602 and 604) and low energy UEs (LEUE) (e.g. 606). An HEUE is a UE with a large power supply or energy source. A HEUE can provide Resource Selection Assistance Information (RSAI) to other UEs in its vicinity, for example based on its sensing of the sidelink channel, i.e. RSAI includes sensing information. An LEUE is a UE with limited energy supply. An LEUE can receive RSAI from HEUEs in its vicinity. An LEUE performs resource selection based on the RSAI (e.g. sensing information from other UEs) it receives. The UEs of the sidelink network of FIG. 6, can be in network coverage, outside of network coverage, or in partial network coverage where some UEs have network coverage, while other UEs have no network coverage. A network can have UEs that provide RSAI to other UEs, and UEs that do not provide RSAI. The UEs that do not perform sidelink sensing can receive RSAI provided by other UEs and use the received RSAI for sidelink resource selection.

A network can have (i) UEs that perform sidelink resource selection based only on sensing information received from other UEs, (ii) UEs that perform sidelink resource selection based on sensing information received from other UEs as well as its own sensing information, and/or (iii) UEs that perform sidelink resource selection based on its own sensing information.

Figure 7:
FIG. 7 illustrates a method for processing of a UE that provides Resource Selection Assistance Information (RSAI) according to embodiments of the present disclosure.
Figure 7:
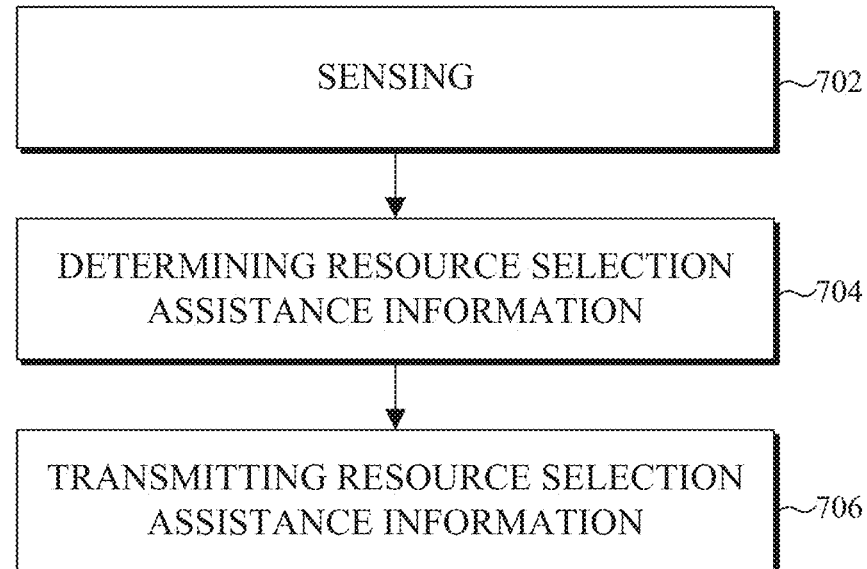
Figure 8:
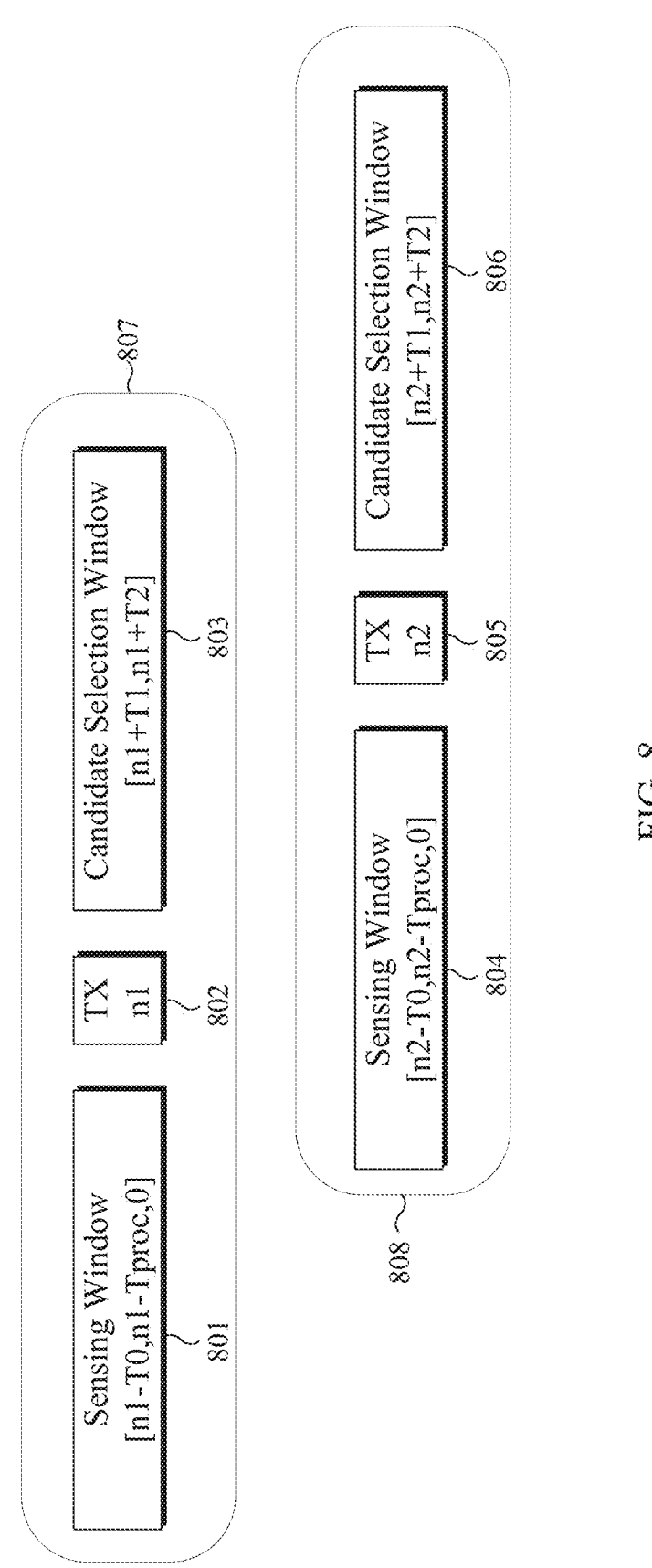
FIG. 8 illustrates an example embodiment of a timing relation of a sensing window according to embodiments of the present disclosure.

FIG. 7 illustrates a method for processing of a UE that provides RSAI according to embodiments of the present disclosure. The steps of the method 700 can be performed by the any of the UEs 111-116 of FIG. 1, such as the UE 116 of FIG. 3. FIG. 8 illustrates an example embodiment 800 of a timing relation of a sensing window according to embodiments of the present disclosure. The embodiments of FIGS. 7 and 8 are for illustration only and other embodiments can be used without departing from the scope of the present disclosure.

As illustrated in FIG. 7, the method 700 describes the processing of a UE that provides RSAI (such as an HEUE). In step 702, a UE, such as the UE 116, performs sensing. The UE of step 702 is a HEUE. For example, a UE that provides RSAI (e.g. an HEUE) can monitor slots/subframes in a sensing window $(n_1-T_0, n_1-T_{proc,0})$. Where, $n_1$ can be the slot/subframe to transmit RSAI.

In step 704, the UE, such as the UE 116, determines RSAI. The resource selection assistance information transmitted in slot/subframe $n_1$ can include candidate resources (e.g. slots/symbols and sub-channels/PRBs) within a candidate resource window $[n_1+T_1, n_1+T_2]$. FIG. 8, described in greater detail below, illustrates a timing relation of a sensing window 801 for a corresponding slot/suframe $n_1$ 802 where a UE (such as an HEUE) that provides RSAI can transmit resource selection assistance information. The RSAI corresponds to a candidate resource window $[n_1+T_1, n_1+T_2]$ 803.

In step 704, the UE, such as the UE 116, transmits RSAI. For example, in step 704 UE (e.g. an HEUE) transmits resource selection assistance information in slot/subframe $n_1$.

Steps 702, 704, and 706, can be repeated every time period as illustrated in FIG. 8. For example, a first RSAI 807, which includes a first corresponding sensing window, slot/subframe for transmitting RSAI and candidate resource window, can overlap a second RSAI 808, which includes sensing window, slot/subframe for transmitting RSAI and candidate resource window. As illustrated in FIG. 8, a first sensing window 801 corresponding to a first RSAI 807 overlaps a second sensing window 804 corresponding to the second RSAI. Furthermore, a first slot/subframe $n_1$ 802 for transmission of the first RSAI and a corresponding first candidate resource window $[n_1+T_1, n_1+T_2]$ 803 can overlap a second sensing window $[n_2-T_0, n_2-T_{proc,0}]$ (804) corresponding to the second RSAI 808.

Although FIG. 7 illustrates the method 700, various changes may be made to FIG. 7. For example, while method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

Figure 9:
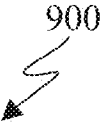
FIG. 9 illustrates a method for processing of a UE that provides RSAI according to embodiments of the present disclosure.
Figure 9:
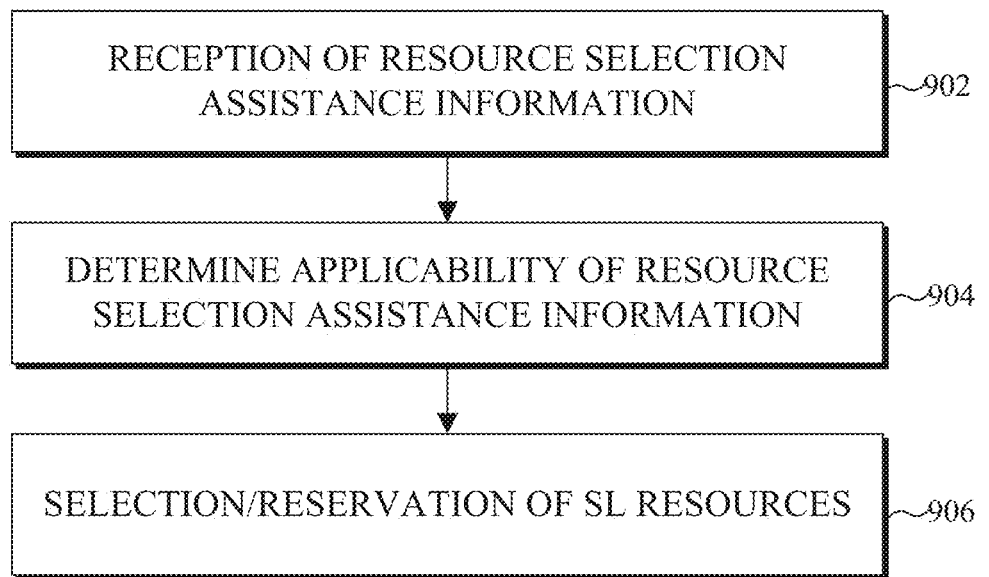

FIG. 9 illustrates a method 900 for processing of a UE that provides RSAI according to embodiments of the present disclosure. For example, the steps of the method 900 can be performed by the any of the UEs 111-116 of FIG. 1, such as the UE 116 of FIG. 3. The method 900 of FIG. 9 is for illustration only and other embodiments can be used without departing from the scope of the present disclosure.

As illustrated in FIG. 9, the method 900 of describes processing of a UE receiving RSAI (such as a LEUE). In step 902, a UE, such as the UE 116, receives RSAI monitors and receives RSAI in a slot/subframe n. The UE of step 902 is a LEUE. In step 904, the UE that received the RSAI determines applicability of RSAI. If RSAI is not applicable, the UE can perform its own sensing and use its own sensing for SL resource selection. If RSAI is applicable, the UE can use the RSAI for SL resource selection. Alternatively, if RSAI is applicable, the UE can use the RSAI and its own sensing for SL resource selection. For example, applicability can be based on location information. For instance, if a distance between a UE transmitting RSAI and the UE receiving the RSAI is less than a (pre-)configured threshold, then the UE that received the RSAI can use the RSAI for resource selection within a corresponding candidate resource window, otherwise, the RSAI can be ignored.

In another example, a first UE transmits RSAI to a second UE. The second UE selects a SL resource to transmit a SL channel to the first UE.

In one example, if the distance between the first UE and the second UE is less than or equal to a threshold (or less than a threshold), the second UE uses its own sensing for the SL resource selection to transmit to the first UE, in this case, given the proximity of the two UEs, the sensed SL interface at the first UE could closely resemble that at the second UE. On the other hand, if the distance between the first UE and the second UE is more than a threshold (or more than or equal to a threshold), the second UE uses RSAI for the SL resource selection to transmit to the first UE, in this case, given the large separation between the two UEs, the sensed SL interface at the first UE is different than that at the second UE.

In another example, if the distance between the first UE and the second UE is less than or equal to a threshold (or less than a threshold), the second UE uses a combination of the RSAI and its own sensing for the SL resource selection to transmit to the first UE, in this case, given the proximity of the two UEs, the sensed SL interface at the first UE could closely resemble that at the second UE. On the other hand, if the distance between the first UE and the second UE is more than a threshold (or more than or equal to a threshold), the second UE uses RSAI for the SL resource selection to transmit to the first UE, in this case, given the large separation between the two UEs, the sensed SL interface at the first UE is different than that at the second UE.

In another example, if the distance between the first UE and the second UE is less than or equal to a threshold (or less than a threshold), the second UE uses its own sensing for the SL resource selection to transmit to the first UE, in this case, given the proximity of the two UEs, the sensed SL interface at the first UE could closely resemble that at the second UE. On the other hand, if the distance between the first UE and the second UE is more than a threshold (or more than or equal to a threshold), the second UE uses a combination of RSAI and its own sensing for the SL resource selection to transmit to the first UE, in this case, given the large separation between the two UEs, the sensed SL interface at the first UE is different than that at the second UE.

For another example, if a UE receives RSAI from more than one UE, the UE that receives the RSAI uses the RSAI from a closest UE transmitting RSAI.

For yet another example, applicability can be based on RSRP of the SL transmission containing the RSAI.

For another example, applicability can be based on a combination of RSRP of the SL transmission containing the RSAI and the distance between a UE transmitting the RSAI and the UE receiving the RSAI. Examples, 1.4 and 1.5, below, describe step 904 in greater details.

In step 906 the UE that received RSAI then performs resource selection using the provided RSAI within a candidate resource window. The UE randomly selects and/or reserves SL resource(s) for its SL transmission(s) within the candidate resource window.

Although FIG. 9 illustrates the method 900, various changes may be made to FIG. 9. For example, while method 900 of FIG. 9 is shown as a series of steps, various steps could overlap, occur in parallel, occur in a different order, or occur multiple times. In another example, steps may be omitted or replaced by other steps. For example, steps of the method 900 can be executed in a different order.

In certain embodiments, (referred to as Example 1.1), the periodicity of transmission of the RSAI can be configured by RRC signaling. For example, RRC signaling can configure one or multiple code points for the periodicity. For another example, the periodicity can be configured or updated to the UE through RRC signaling and/or MAC control element (CE) signaling and/or L1 control signaling. For yet another example, the code points for periodicity can be updated by RRC signaling and/or MAC CE signaling.

Figure 10:
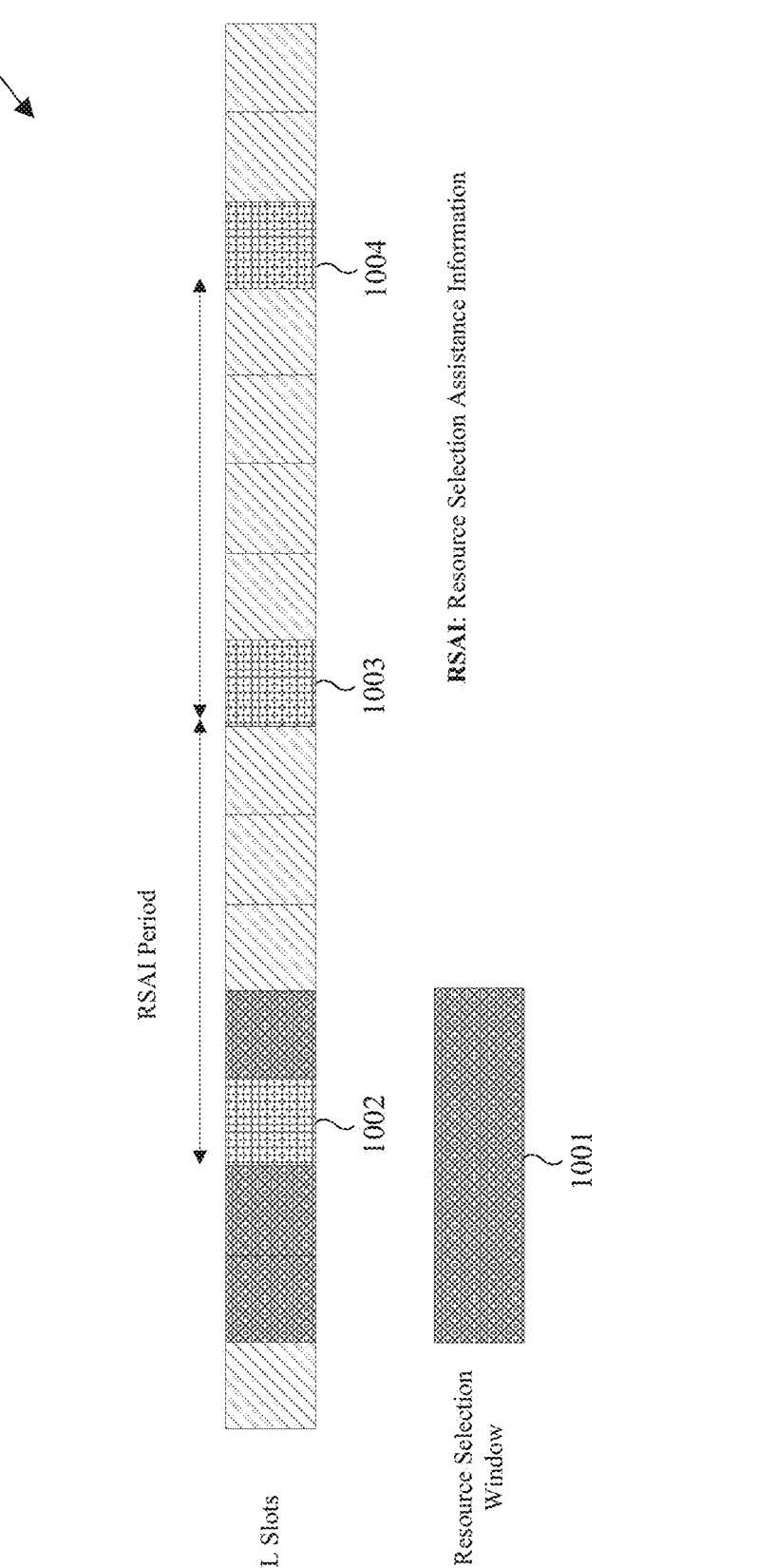
FIG. 10 illustrates an example embodiment for resource selection of sidelink resources for the transmission of RSAI according to embodiments of the present disclosure.

FIG. 10 illustrates an example embodiment 1000 for resource selection of sidelink resources for the transmission of RSAI according to embodiments of the present disclosure. The example 1000 of FIG. 10 is for illustration only and other embodiments can be used without departing from the scope of the present disclosure.

For example (denoted as Example 1.1.1), a UE, such as the UE 116 can be configured with a periodically for the transmission of the RSAI. A UE performs sensing and resource selection according to the procedures described in Rel-16 for sidelink resource selection [38.214 and 38.321] to select a sidelink resource for transmission of the RSAI and with a semi-persistent resource reservation period for subsequent transmissions of future RSAI corresponding to the configured periodicity.

As shown in FIG. 10, embodiment 1000 illustrates an example for resource selection of sidelink resources for the transmission of RSAI. If a UE does not have a reserved resource for transmission of a first RSAI, a UE performs resource selection within a resource selection window 1002 based on sensing information in an earlier sensing window. A UE selects a sidelink resource 1004 within the resource selection window for transmission of the first RSAI according to Rel-16 sidelink procedures. A UE can indicate reservation for future sidelink resources (such as 1006, 1008, . . . ) based on a resource reservation period set according to the periodicity of transmission of RSAI. A UE can also reserve resources for retransmission. If reserved sidelink resource 1006 is not pre-empted, a UE transmits a second RSAI in sidelink resource 1006, else a UE performs sidelink resource selection according to REL-16 procedures. This procedure continues for future transmission of RSAI.

For another example (denoted as Example 1.1.2), a UE, such as the UE 116, is configured with a periodicity for the transmission of the RSAI, as well as an offset within a period. In this example, a UE transmitting RSAI does not perform sensing to find a sidelink resource, as sidelink resources have been (pre-)configured, i.e. pre-reserved and pre-allocated to a UE for transmission of RSAI.

As described in Examples 1.1.1 and 1.1.2, the periodicity and/or offset of RSAI can be in physical slots and/or logical slots, wherein physical slots, include all slots numbered sequential, while logical slots include only slots that can be allocated to sidelink (e.g. uplink slots, or slots with enough uplink symbols for sidelink transmission) numbered sequentially.

For yet another example (denoted as Example 1.1.3), a gNB, such as the BS 102 schedules a sidelink transmission that includes the RSAI. The gNB schedules the sidelink transmission including the RSAI through a DCI format sent to a UE transmitting the RSAI.

In certain embodiments, (referred to as Example 1.2) a UE, such as the UE 116) determines whether to transmit or not transmit RSAI.

For example (denoted as Example 1.2.1), a UE can be configured to enable or disable the transmission of RSAI. Such configuration can be from a network or from other UEs. The configuration can be through (i) RRC signaling, (ii) MAC CE signaling, (iii) L1 control signaling, or (iv) any combination thereof.

For instance, the configuration can additionally depend on the location of the UE. For example, if a first UE receives a configuration from a second UE to disable transmission of RSAI, then the first UE determines a distance between the first UE and the second UE. Based on this distance the first UE can disable or not disable transmission of RSAI. For another example, if the distance between the first UE and the second UE exceeds a (pre-)configured threshold, then the transmission of RSAI is not disabled.

For another instance, the configuration can additionally depend on the SL RSRP. For example, if a first UE receives a configuration from a second UE to disable transmission of RSAI, then the first UE determines a SL RSRP of the received configuration message. Based on the SL RSRP the first UE can disable or not disable transmission of RSAI. For another example, if the SL RSRP between the first UE and the second UE does not exceed a (pre-)configured threshold, then the transmission of RSAI is not disabled.

For yet another instance, the configuration can additionally depend on the SL pathloss. For example, if a first UE receives a configuration from a second UE to disable transmission of RSAI, then the first UE determines a SL pathloss between the first UE and the second UE. Based on this SL pathloss the first UE can disable or not disable transmission of RSAI. For another example, if the SL pathloss between the first UE and the second UE exceeds a (pre-)configured threshold, then the transmission of RSAI is not disabled.

In the above examples, the (i) distance threshold, (ii) SL RSRP threshold, (iii) SL pathloss threshold, or (iv) any combination thereof can be based on the priority of the received sidelink transmission and/or the priority of the intended sidelink transmission from the UE receiving the RSAI.

For another (denoted as Example 1.2.2), a UE can be (pre-)configured to transmit RSAI. Additionally a UE can monitor RSAI transmission from other UEs in its vicinity, if a UE a receives RSAI from other UE(s) it can determine whether it should transmit its own RSAI or not.

For instance, such determination can be made based on the location of the UE(s) transmitting RSAI and the location of the UE making the determination whether or not to transmit RSAI. If the other UE(s) is in a close (or near) proximity (i.e. distance between UE(s) transmitting RSAI and UE making the determination of whether or not to transmit RSAI is less than a (pre-)configured distance threshold), then the UE making the determination whether or not to transmit RSAI does not transmit RSAI. Additionally, or alternatively, the determination can be based on the SL RSRP or the SL pathloss with respect to the UE transmitting the RSAI.

For another instance, a UE transmitting RSAI can indicate to other UEs in its vicinity not to transmit RSAI. The UE can indicate to other UEs to not transmit RSAI based on a distance criteria, SL RSRP criteria, SL pathloss criteria, or any combination thereof.

For another instance, such determination of whether or not to transmit RSAI can be made based on the number of detected UEs transmitting RSAI, and possibly based on the distance/SL RSRP/SL pathloss between those UEs and the UE making the determination whether or not to transmit RSAI.

For another instance, UEs transmitting RSAI and within communication range of each other can co-ordinate transmission of RSAI. That is, the communication range can be based on distance between UE(s) and/or SL RSRP (i.e. SL signal strength) between UEs and/or SL pathloss between UEs. Such co-ordination can include presence or absence or RSAI from a UE, information content of RSAI and SL resources for transmission of RSAI from UEs transmitting RSAI.

For yet another instance, (i) the distance threshold, (ii) the SL RSRP threshold, (iii) the SL pathloss threshold, or (iv) any combination thereof, can be based on the priority of the received sidelink transmission. Similarly, (i) the distance threshold, (ii) the SL RSRP threshold, (iii) the SL pathloss threshold, or (iv) any combination thereof, can be based the priority of the intended sidelink transmission from the UE receiving the RSAI.

For any example (denoted as Example 1.2.3), a UE transmitting RSAI can be a Road Side Unit (RSU).

The RSU can be configured with time/frequency resources for transmission of RSAI (e.g. based on periodicity and offset within the periodicity). Alternatively the RSU can determine the time frequency resources based on sensing of the sidelink to identify candidate sidelink resources and resource selection from within the candidate sidelink resources.

The RSU can indicate to other non-RSU UEs in its vicinity not to transmit (or to transmit) RSAI. In some examples, the indication of not transmitting (or to transmit) RSAI can apply to UEs within a (pre-)configured distance of the RSU/SL RSRP/SL pathloss to the RSU. For instance, the RSU can indicate the SL resources to be used for RSAI transmission. For another instance, (i) the distance threshold, (ii) the SL RSRP threshold, (iv) the SL pathloss threshold, or (iv) any combination thereof can be based on the priority of the received sidelink transmission. Similarly, (i) the distance threshold, (ii) the SL RSRP threshold, (iv) the SL pathloss threshold, or (iv) any combination thereof can be based on the priority of the intended sidelink transmission from the UE receiving the RSAI.

For yet another example, (denoted as Example 1.2.4), a UE transmitting RSAI can be a (pre-)configured leader of a group of UEs with a behavior similar to that of an RSU as described in example 1.2.3, above.

In certain embodiments, (referred to as Example 1.3), the RSAI can include some or all of the following information types or fields, such as (i) candidate resources, (ii) location information of a UE transmitting the RSAI, (iii) period of RSAI, and (iv) presence of RSAI from other UEs. It is noted that the RSAI can be included in a first part/stage Sidelink Control Information (SCI), a second part/stage SCI, a Sidelink Shared Channel (SL-SCH), or any combination thereof. The fields of the RSAI can be optionally included in different channel types.

As discussed above, the first information type or field, that can be included in the RSAI is period of RSAI is candidate resources. Candidate resources can be available for sidelink resource selection within a candidate resource window 803 and 806 of FIG. 8.

For example, a candidate resource available for sidelink resource selection is determined by time domain and frequency domain resource indication.

For another example, a candidate resource available for sidelink resource selection is a single-slot resource for sidelink transmission $R_{x,y}$. Where, y is a slot index within the candidate resource window, and x defines a set of $L_{subCH}$ contiguous sub-channels starting from sub-channel x to sub-channel $x+L_{subCH}-1$. In some examples, $L_{subCH}=1$, while in other examples $L_{subCH}$ is (pre-)configured. In some examples, the slot index y can be a physical or logical slot index and can be determined by slot index within a resource pool, while in other examples the slot index y is a physical or logical slot index and can be determined relative to the start of the candidate resource window.

For another example, the time domain indication of a candidate resource available for sidelink resource selection is in (i) units of symbols, (ii) units of sub-slots, (iii) units of slots, (iv) units of symbols and sub-slots, (v) units of sub-slots and slots, (vi) units of symbols and slots, or (vii) units of symbols, sub-slots and slots. The indicated index(es) can be a physical or logical index within a sidelink resource pool, or a within the candidate resource window.

For another example, the frequency domain indication of a candidate resource available for sidelink resource selection is in units of PRBs, or in units of sub-channels, or in units of PRBs and sub-channels. The indicated index(es) can be within a carrier, wherein index 0 corresponds to the lowest PRB of the carrier. The indicated index(es) can be within a BWP, wherein index 0 corresponds to the lowest PRB of the BWP. The indicated index(es) can be within the frequency domain allocation of a sidelink resource pool, wherein index 0 corresponds to the lowest PRB of the sidelink resource pool.

For another example, the RSAI can include the location of the candidate resource window. The location of the candidate resource window can include (i) a starting slot/symbol and an ending slot/symbol, (ii) a starting slot/symbol and a duration of the candidate resource window, or (iii) an ending slot/symbol and a duration of the candidate resource window. Additionally, the location of the candidate resource window can include (i) a starting PRB or sub-channel and an ending PRB or sub-channel, (ii) a starting PRB or sub-channel and a frequency extent of a candidate resource window in PRB s or sub-channels, or (iii) an ending PRB or sub-channel and a frequency extent of a candidate resource window in PRBs or sub-channels. The starting and/or ending of a candidate resource window in frequency domain can be relative to a start of a BWP or relative to a start or center frequency of a carrier.

For another example, a UE transmitting RSAI can indicate available candidate resources (e.g., preferred resources for transmission from the UE receiving the RSAI) for SL resource selection within a candidate resource window, and undetermined resources for SL resource selection within a candidate resource window. Undetermined resources refer to resources that have been excluded because a UE did not monitor a sidelink slot during a sensing window because of its own sidelink transmission. For these resources, a UE assumes a hypothetical SCI Format 1-A is in received in each single-slot resource in each slot within the sensing window that the UE didn't monitor due to its own transmission, and with a "Resource reservation period" set to any periodicity value allowed by a higher layer parameter sl-ResourceReservePeriodList as described earlier. Separate indicators can be used for available resources for SL resource selection and undetermined resources for SL resource selection. The benefit of doing this, is in case a UE receiving RSAI receives RSAI from more than one UE, and resources that are not available during a candidate resource window from a first UE because of the first UE's own sidelink transmission in the sensing window and are available in the candidate resource window of a second UE can be used for sidelink resource selection by the UE receiving the RSAI.

A UE transmitting the RSAI can exclude from the candidate resources of a candidate resource window, resources used in slots for its own sidelink transmission. Alternatively, these resources can be indicated by a separate indication. The UE can indicate these as unavailable resources (e.g., not preferred resources for transmission from the UE receiving the RSAI) for SL resource selection.

For yet another example, if the available SL resources within the candidate resource window is less than, a predefined percentage, such as X %, where X is specified by system specifications or (pre-)configured, then a UE can increase the SL-RSRP threshold in steps of Y dB, where Y is specified by system specifications or (pre-)configured and repeats the resource selection procedure until the available SL resources within the candidate resource window is not less than X %. The SL RSRP threshold for determination of available sidelink resource in the candidate window can be included in the RSAI.

As discussed above, the third information type or field that can be included in the RSAI is location information of a UE transmitting the RSAI. The location information can be provided by a zone ID of a UE transmitting RSAI. The location information can be provided a GPS co-ordinate of a UE transmitting RSAI. For example, the GPS co-ordinate can be the absolute co-ordinate. For another example, the GPS co-ordinate can be a co-ordinate relative to (pre-) configured reference point. The granularity(ies) of the latitude and longitude co-ordinates can be (pre-)configured.

As discussed above, the third information type or field that can be included in the RSAI is period of RSAI. The period of the RSAI can be included from the UE transmitting the RSAI, to assist a UE receiving the RSAI to identify future transmissions of the RSAI. The period of the RSAI is (pre-)configured to a UE receiving the RSAI. For example, a UE transmitting RSAI can indicate whether it intends to transmit new RSAI with this period.

As discussed above, the fourth information type or field that can be included in the RSAI is presence of RSAI from other UEs. A UE transmitting RSAI can include information about other UEs in the vicinity that are transmitting RSAI. This is to assist a UE receiving the RSAI in detecting and receiving transmission from the other UEs in the vicinity transmitting RSAI. This information can include time and frequency resources used by these transmission(s). This information can also include location information of the UE(s) transmitting the RSAI, to help the UE receiving the RSAI decide whether or not to receive the RSAI of these UE(s) based on a distance criteria.

In certain embodiments, (referred to as Example 1.4), a UE receiving RSAI can monitor, detect and receive RSIA based one or more of the following examples.

For example, a UE receiving RSAI is (pre-)configured time/frequency resources of UEs in its vicinity transmitting RSAI, a UE receiving RSAI monitors these time/frequency resources for reception of RSAI. For instance, the sidelink resources for receiving RSAI are configured through a network/gNB, wherein a gNB sends a DCI format to UE(s) receiving RSAI informing of the respective SL resources of the RSAI transmissions.

For another example, a UE receiving RSAI monitors and receives a first part/stage SCI for reception of RSAI. A flag in the first part/stage SCI can indicate the presence or absence of RSAI in a sidelink transmission.

For another example, a UE receiving RSAI monitors and receives a first part/stage SCI for reception of RSAI. An RNTI (pre-)configured or specified in the system specification can scramble the CRC of the first part/stage SCI to indicate the presence of RSAI in a sidelink transmission.

For another example, a UE receiving RSAI attempts to receive a second part/stage SCI for reception of RSAI after receiving a first part/stage SCI. A flag in the second part/stage SCI can indicate the presence or absence of RSAI in a sidelink transmission.

For another example, a UE receiving RSAI attempts to receive a second part/stage SCI for reception of RSAI after receiving a first part/stage SCI. An RNTI (pre-)configured or specified in the system specification can scramble the CRC of the second part/stage SCI to indicate the presence of RSAI in a sidelink transmission.

For another example, a UE receiving the RSAI, determines a transmission containing RSAI after receiving and decoding the SL-SCH transmitted on PSSCH.

For another example, a UE after receiving RSAI from a UE on a sidelink transmission occasion is indicated other sidelink transmission occasion(s) containing RSAI from a same UE. Where, a sidelink transmission occasion can be determined by time and/or frequency resources.

For another example, a UE after receiving RSAI from a UE on a sidelink transmission occasion is indicated other sidelink transmission occasion(s) containing RSAI from other UE(s). Wherein, a sidelink transmission occasion can be determined by time and/or frequency resources.

For yet another example, a UE that receives RSAI monitors and receives the RSAI based on one or more of the previous sub-examples of example 1.4.

In certain embodiments (referred to as Example 1.5), a UE receiving RSAI, makes a determination after receiving the RSAI on the applicability the RSAI. That is the UE determines whether to use the RSAI for sidelink resource selection or not. Such determination can be based on the following examples.

For example (denoted as Example 1.5.1), the determination can be based on the distance between a UE transmitting RSAI and the UE receiving the RSAI, If the distance does not exceed a threshold, the UE receiving the RSAI uses the RSAI for sidelink resource selection.

For another example (denoted as Example 1.5.2), the determination can be based on the distance between a UE transmitting RSAI and the UE receiving the RSAI. If the UE receiving the RSAI receives RSAI from a first UE and receives RSAI from a second UE(s), the distance between the UE receiving the RSAI and the first UE transmitting the RSAI is less than the distance between the UE receiving the RSAI and the second UE(s) transmitting the RSAI, the UE receiving the RSAI uses the RSAI transmitted by the first UE for sidelink resource selection.

For instance, in case one or more UE(s) have a same smallest distance to a UE receiving RSAI, a UE receiving the RSAI can randomly select the RSAI of one of the UEs with the smallest distance. For another instance, in case one or more UE(s) have a same smallest distance to a UE receiving RSAI, a UE receiving the RSAI can select the RSAI of a UE with the smallest distance based on a (pre-)configured ordering of UEs. For another instance, in case one or more UE(s) have a same smallest distance to a UE receiving RSAI, a UE receiving the RSAI can determine the candidate sidelink resources available for sidelink resource selection based on the intersection of the RSAI received from UEs with the smallest distance (see examples of example 1.5.7 and example 1.5.8, and FIG. 11 and FIG. 12, discussed below). For yet another instance, in case one or more UE(s) have a same smallest distance to a UE receiving RSAI, a UE receiving the RSAI can determine the candidate sidelink resources available for sidelink resource selection based on the union of the RSAI received from UEs with the smallest distance (see examples of example 1.5.7 and example 1.5.8, and FIG. 11 and FIG. 12, discussed below).

For another example (denoted as Example 1.5.3), the determination can be based on the SL RSRP of a UE transmitting RSAI, wherein if the SL RSRP equals or exceeds a threshold, the UE receiving the RSAI uses the RSAI for sidelink resource selection.

For another example (denoted as Example 1.5.4), the determination can be based on the SL RSRP of a UE transmitting RSAI, wherein if the UE receiving the RSAI receives RSAI from a first UE and receives RSAI from a second UE(s), the SL RSRP of the first UE transmitting the RSAI is greater than the SL RSRP of the second UE(s) transmitting the RSAI, the UE receiving the RSAI uses the RSAI transmitted by the first UE for sidelink resource selection.

For instance, in case one or more UE(s) have a same or substantially a same greatest SL RSRP, a UE receiving the RSAI can randomly select the RSAI of one of the UEs with the greatest SL RSRP. For another instance, in case one or more UE(s) have a same or substantially a same greatest SL RSRP, a UE receiving the RSAI can select the RSAI of a UE with the greatest SL RSRP based on a (pre-)configured ordering of UEs. For another instance, in case one or more UE(s) have a same or substantially a same greatest SL RSRP, a UE receiving the RSAI can determine the candidate sidelink resources available for sidelink resource selection based on the intersection of the RSAI received from UEs with the greatest SL RSRP (see examples of example 1.5.7 and example 1.5.8, and FIG. 11 and FIG. 12, discussed below). For yet another instance, in case one or more UE(s) have a same or substantially a same greatest SL RSRP, a UE receiving the RSAI can determine the candidate sidelink resources available for sidelink resource selection based on the union of the RSAI received from UEs with the greatest SL RSRP (see examples of example 1.5.7 and example 1.5.8, and FIG. 11 and FIG. 12, discussed below).

For another example (denoted as Example 1.5.5), the determination can be based on the SL pathloss between a UE transmitting RSAI and the UE receiving the RSAI, wherein if the SL pathloss does not exceed a threshold, the UE receiving the RSAI uses the RSAI for sidelink resource selection.

For another example (denoted as Example 1.5.6), the determination can be based on the SL pathloss between a UE transmitting RSAI and the UE receiving the RSAI, wherein if the UE receiving the RSAI receives RSAI from a first UE and receives RSAI from a second UE(s), the SL pathloss between the UE receiving the RSAI and the first UE transmitting the RSAI is less than the SL pathloss between the UE receiving the RSAI and the second UE(s) transmitting the RSAI, the UE receiving the RSAI uses the RSAI transmitted by the first UE for sidelink resource selection.

For instance, in case one or more UE(s) have a same smallest SL pathloss to a UE receiving RSAI, a UE receiving the RSAI can randomly select the RSAI of one of the UEs with the smallest SL pathloss. For another instance, in case one or more UE(s) have a same smallest SL pathloss to a UE receiving RSAI, a UE receiving the RSAI can select the RSAI of a UE with the smallest SL pathloss based on a (pre-)configured ordering of UEs. For another instance, in case one or more UE(s) have a same smallest SL pathloss to a UE receiving RSAI, a UE receiving the RSAI can determine the candidate sidelink resources available for sidelink resource selection based on the intersection of the RSAI received from UEs with the smallest SL pathloss (see examples of example 1.5.7 and example 1.5.8, and FIG. 11 and FIG. 12, discussed below). For yet another instance, in case one or more UE(s) have a same smallest SL pathloss to a UE receiving RSAI, a UE receiving the RSAI can determine the candidate sidelink resources available for sidelink resource selection based on the union of the RSAI received from UEs with the smallest SL pathloss (see examples of example 1.5.7 and example 1.5.8, and FIG. 11 and FIG. 12, discussed below).

Figure 11:
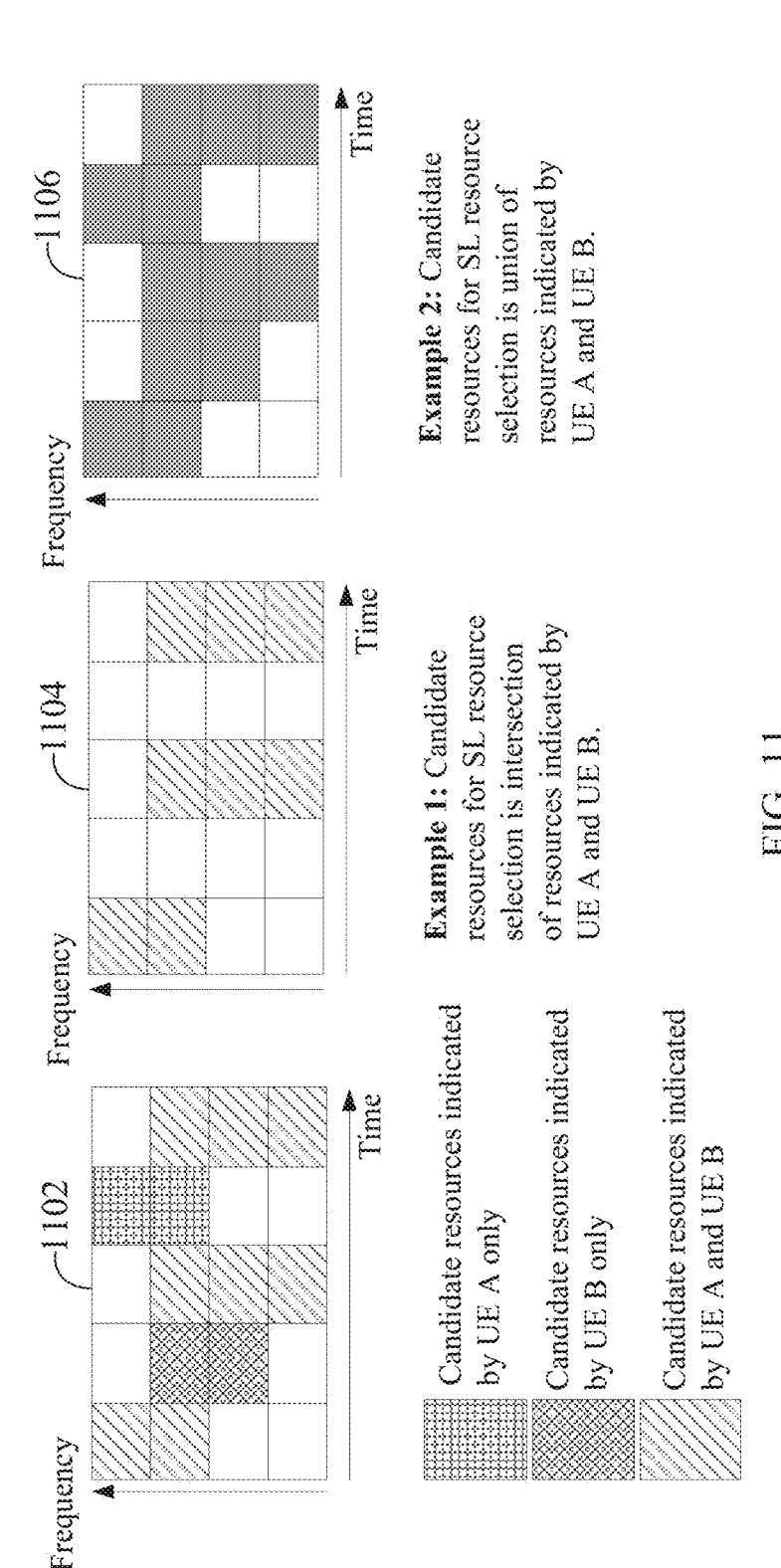
FIGS. 11 and 12 illustrate an example embodiments where a UE receives RSAI from two UEs according to embodiments of the present disclosure
Figure 12:
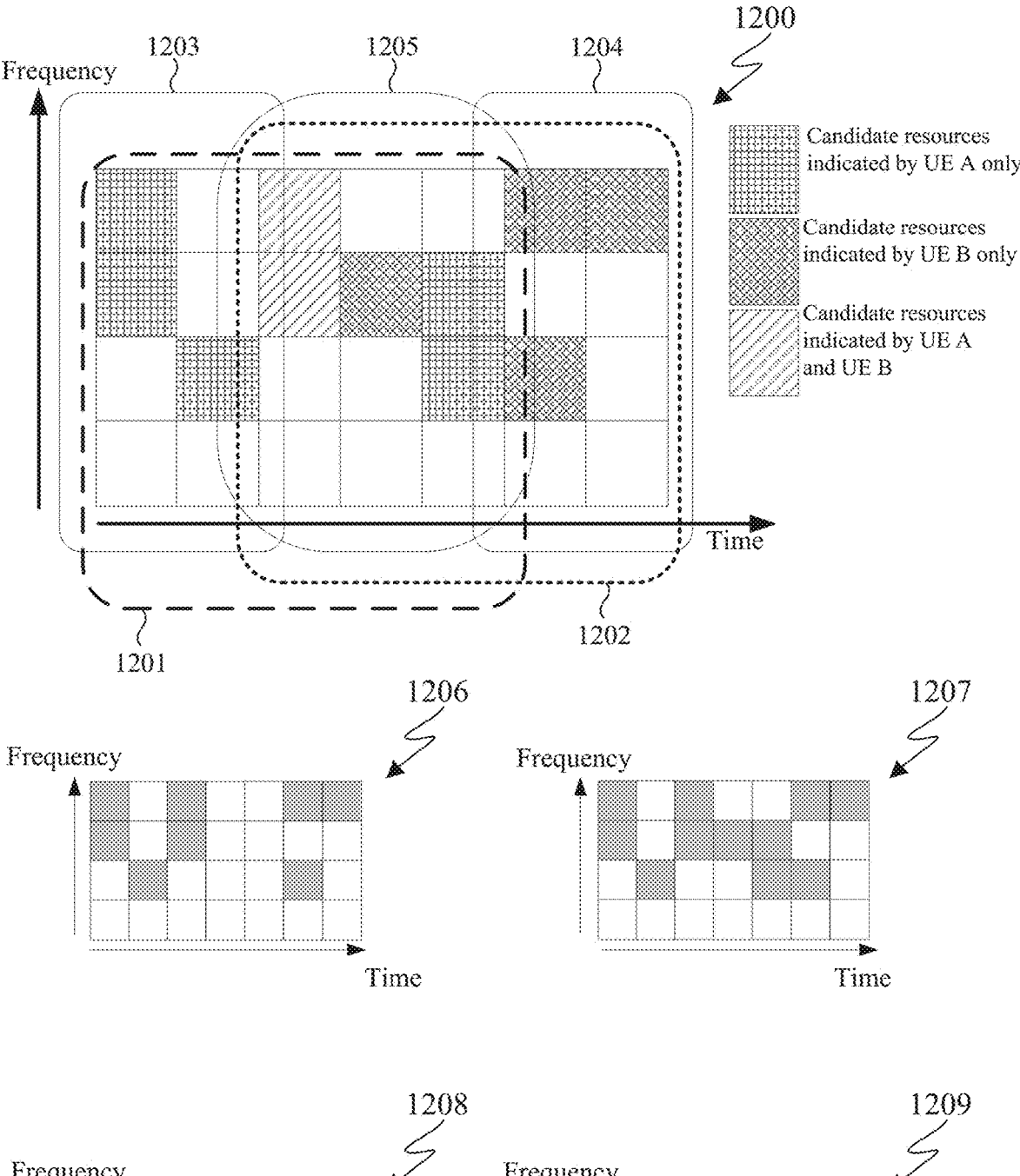

For another example (denoted as Example 1.5.7), a UE receives RSAI from more than one UE, where each RSAI includes candidate resources for SL resource selection within a same candidate resource window. FIGS. 11 and 12 illustrate an example embodiments, where a UE receives RSAI from two UEs according to embodiments of the present disclosure. The embodiments of FIGS. 11 and 12 are for illustration only and other embodiments can be used without departing from the scope of the present disclosure.

As described in FIG. 11 a UE receives RSAI from two UEs, within the same candidate resource window, as shown in graph 1102. In one example, the candidate resources for sidelink resource selection is the intersection of the resources indicated from a first UE and a second UE, as shown in graph 1104. In another example, the candidate resources for sidelink resource selection is the union of the resources indicated from a first UE and a second UE, as shown in graph 1106. The examples of FIG. 11, can be extended to more than 2 UEs.

For another example (denoted as Example 1.5.8), a UE receives RSAI from more than one UE, where each RSAI includes candidate resources for SL resource selection within a different candidate resource window. This is illustrated in the multiple graphs of FIG. 12, such as graphs 1200, 1206, 1207, 1208, and 1209. In particular, FIG. 12 illustrates an example where a UE receives RSAI from two UEs.

The graph 1200, of FIG. 12, describes a scenario where a UE receives RSAI from two UEs (denoted as UE_A and UE_B). The candidate resource window of UE_A is 1201, while the candidate resource window of UE_B is 1202. In particular, as illustrated, for example, in graph 1206, the candidate resources for sidelink resource selection can include candidate resources from UE_A in the part of the UE_A candidate resource window that does not intersect with the candidate resource window of UE_B (1203). The candidate resources for sidelink resource selection can also include candidate resources from UE_B in the part of the UE_B candidate resource window that does not intersect with the candidate resource window of UE_A (1204). The candidate resources for sidelink resource selection can further include the intersection of resources indicated by UE_A and UE_B in the common part of the candidate resource window (1205).

The graph 1207, of FIG. 12, describes an example where the candidate resources for sidelink resource selection includes candidate resources from UE_A in the part of the UE_A candidate resource window that does not intersect with the candidate resource window of UE_B (1203). The graph 1207, of FIG. 12, also describes an example where the candidate resources for sidelink resource selection includes candidate resources from UE_B in the part of the UE_B candidate resource window that does not intersect with the candidate resource window of UE_A (1204). The graph 1207, of FIG. 12, further describes an example where the candidate resources for sidelink resource selection includes the union of resources indicated by UE_A and UE_B in the common part of the candidate resource window (1205).

The graph 1208, of FIG. 12, describes an example where the candidate resources for sidelink resource selection includes the intersection of resources indicated by UE_A and UE_B in the common part of the candidate resource window (1205).

The graph 1209, of FIG. 12, describes an example where the candidate resources for sidelink resource selection includes the union of resources indicated by UE_A and UE_B in the common part of the candidate resource window (1205).

The example, of FIG. 12, can be extended to more than 2 UEs.

For another example (denoted as Example 1.5.9), the determination can be based on a UE that receives separate indication for available resources in the candidate resource window and resources that have been excluded due to the own transmission of a UE transmitting the RSAI during a sensing window (e.g., undetermined resources). These resources can be made available for the receiving UE's sidelink resource selection if indicated as available by the RSAI received from another UE.

For another example (denoted as Example 1.5.10), the determination can be based whether a UE receives more than one RSAI and a SL RSRP threshold for determining the SL resources in the candidate resource window is different. The UE receiving the RSAI can select the RSAI report to use based on the SL RSRP threshold for determining the SL resources in the candidate resource window. For example, a UE can use the RSAI corresponding to a smaller threshold.

For yet another example, a UE that receives RSAI determines the candidate resource set within a candidate resource window based on one or more of the previous sub-examples of example 1.5.

In the previous examples, the (i) distance threshold (ii) SL RSRP threshold (iii) SL pathloss threshold or (iv) any combination thereof can be based on the priority of the received sidelink transmission and/or the priority of the intended sidelink transmission from the UE receiving the RSAI.

Resource Selection Assistance Information on Uu Interface (Component 2)

Figure 13:
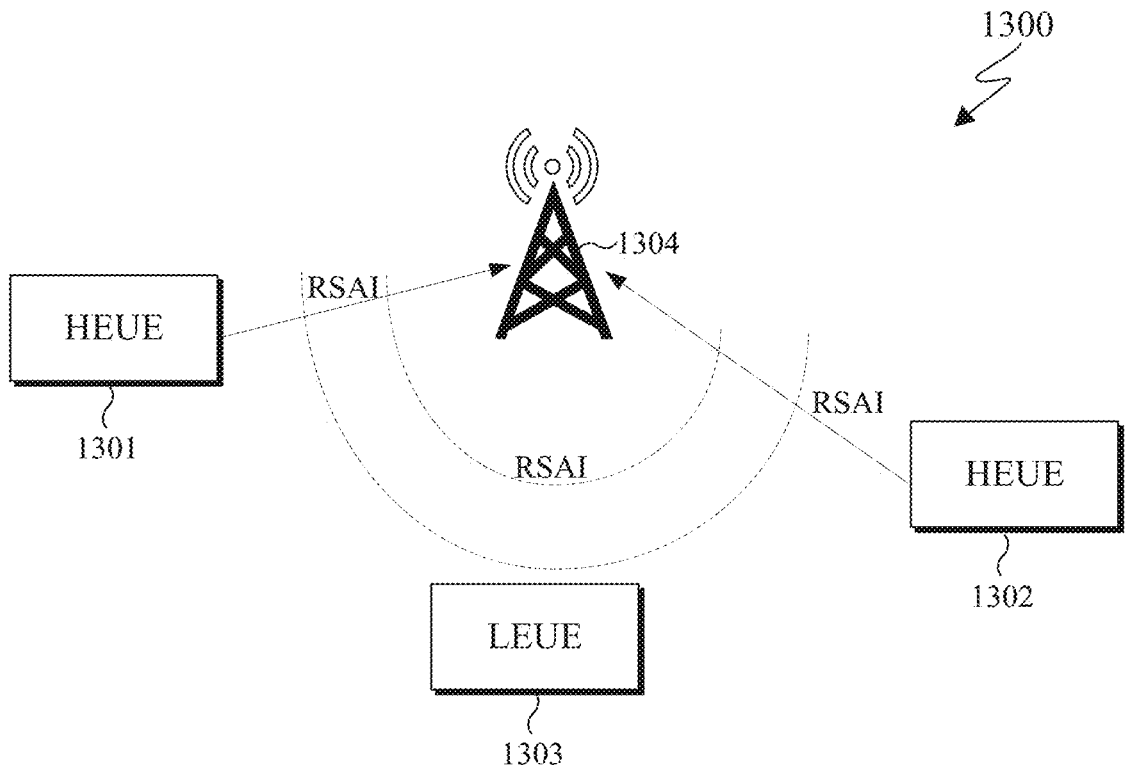
FIG. 13 illustrates example embodiment of RSAI that is conveyed through a network according to embodiments of the present disclosure.

FIG. 13 illustrates an example embodiment of RSAI that is conveyed through a network 1300 according to embodiments of the present disclosure. The network 1300 of FIG. 13 is for illustration only and other embodiments can be used without departing from the scope of the present disclosure.

As illustrated in FIG. 13, the RSAI is received from the network on the Uu interface (such as the link between the UE 116 and the BS 102), rather than from other UEs on the sidelink interface. The advantage of doing so, is that the sidelink UE does not need to monitor and receive on the sidelink interface. This provides at least two advantages. First, this reduces the power consumption of the sidelink UE by not receiving on the sidelink. Second, the sidelink UE receiving RSAI from the network, can just have a sidelink transmitter and not implement a sidelink receiver, which reduces the complexity of the sidelink UE.

As illustrated in FIG. 13, and according to the examples of component 2, the resource selection assistance information can be conveyed through the network, such as through the gNB. For example, A UE, such as the HEUE 1301 and 1302 of FIG. 13, can provide RSAI to the network 1304 (e.g. gNB). The network 1304 (e.g. gNB) can provide the RSAI to sidelink UEs such as the LEUE 1303. In certain embodiments, the RSAI can also be received by other sidelink UEs, such as the HEUE 1301 and 1302. A UE (such as the LEUE 1303 and possibly the HEUE 1101 and 1102) that receives the RSAI can use the RSAI in addition to its own sensing information (if available) for sidelink resource selection.

It is noted that the processing steps of the UE transmitting the RSAI and the UE receiving the RSAI follows the methods 700 and 900, of FIGS. 7 and 9, describe above. In this scenario, the RSAI is transmitted to the gNB/Network and the RSAI is received from the gNB/Network.

In certain embodiments, (referred to as Example 2.1) a UE transmitting RSAI to the network, can been (pre-)configured to provide RSAI. The (pre-)configuration can include Time/frequency resources to transmit RSAI. The (pre-)configuration can include Contents of RSAI according to the examples of Example 1.3, described above. The (pre-)configuration can be updated through (i) remote radio head (RRH) signaling, (ii) MAC CE signaling, (iii) L1 control signaling, or (iv) any combination thereof. For example, the time/frequency resources can be configured through a dynamic grant, a Type 1 configured grant, a Type 2 configured grant, or a combination thereof.

In certain embodiments, (referred to as Example 2.1), a gNB can transmit the RSAI to a UE through a unicast transmission. In certain embodiments, (referred to as Example 2.3), a gNB can transmit the RSAI to a group of UEs through a groupcast transmission. In certain embodiments, (referred to as Example 2.4), a gNB can broadcast the RSAI to sidelink UEs. In certain embodiments, (referred to as Example 2.5), a UE receiving the RSAI can determine the applicability of the RSAI following the examples of example 1.5, described above.

Figures 14, 15:
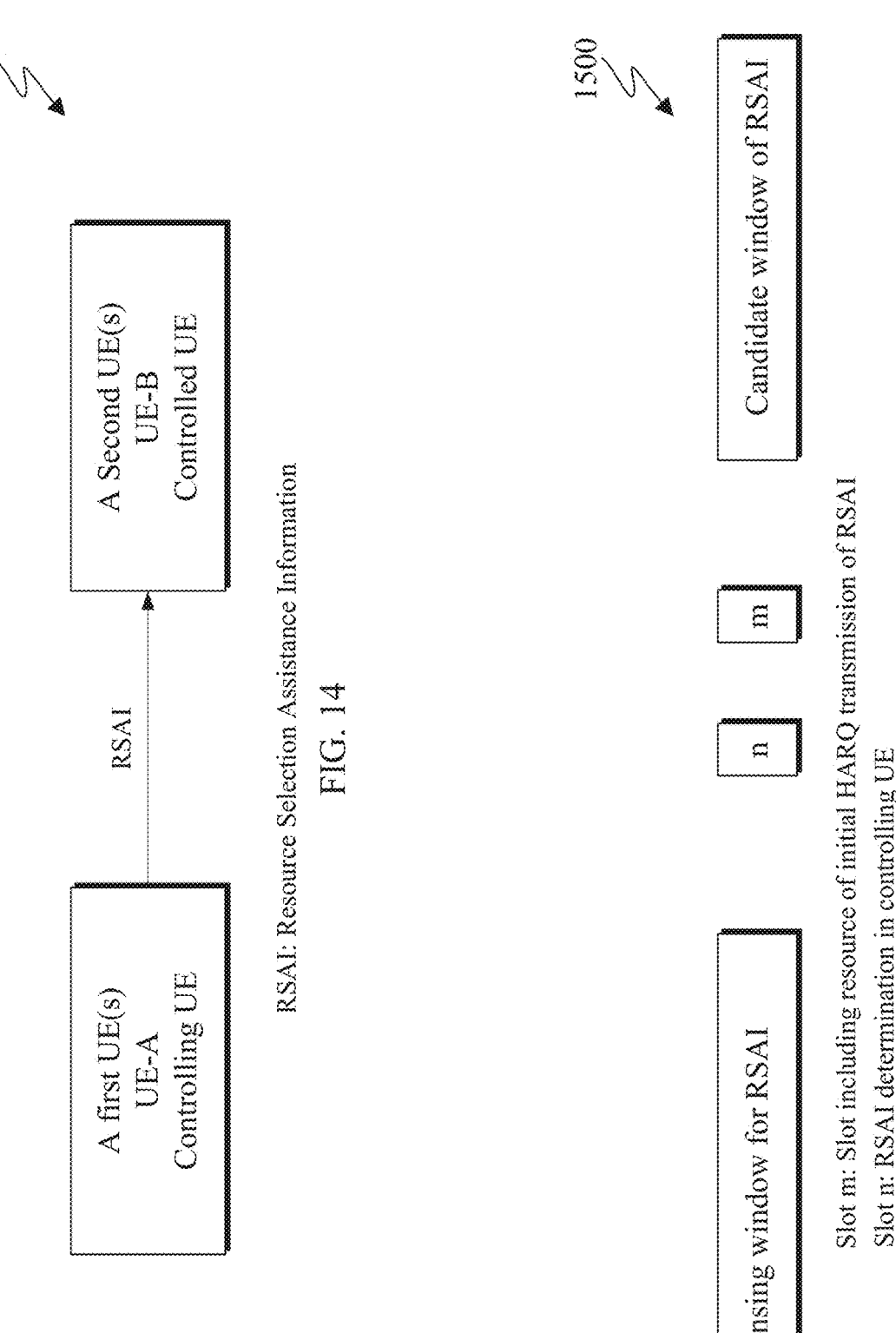
FIG. 14 illustrates an embodiment of a controlled UE selecting and reserving one or more a resources from a set of resources provided in the RSAI from a controlling UE according to embodiments of the present disclosure.
FIG. 15 illustrates an example of the timing of the RSAI determination and transmission procedure according to embodiments of the present disclosure.

The embodiments and examples described below relate to determining transmitting resource selection assistance information. In the following components and examples, a first UE or UEs, e.g. UE-A, also referred to as the controlling UE (or UEs) provides a set of resources and possibly other RSAI, to a second UE or UEs, e.g. UE-B, also referred to as controlled UE (or UEs). In these components and examples, the UE-A may be a HEUE as discussed above and the UE-B may be a LEUE as discussed above, and the previous examples of HEUE and LEUE may apply to the discussion of UE-A and UE-B, respectively, herein. The controlled UE (i.e. the second UE or UE-B) selects and reserves a resource or multiple resources from the set of resources provided in the RSAI from the controlling UE (i.e. the first UE or UE-A). This is illustrated in FIG. 14. In particular, FIG. 14 illustrates an embodiment 1400 of a controlled UE selecting and reserving one or more a resources from a set of resources provided in the RSAI from a controlling UE according to embodiments of the present disclosure. The embodiment 1400 of FIG. 14 is for illustration only and other embodiments can be used without departing from the scope of the present disclosure. Additionally, as described earlier, UE-B (e.g., the controlled UE) can perform sidelink resource selection based RSAI from UE-A(s) as well as its own sensing information.

In certain embodiments, the RSAI from a first UE (i.e. a controlling UE) can be transmitted as a broadcast message to all UEs in the vicinity of the controlling UE. In certain embodiments, the RSAI from a first UE (i.e. a controlling UE) can be transmitted as a groupcast message to a set of UEs in the vicinity of the controlling UE, within a (pre-) configured set for example, the set of UEs can be addressed by a common identifier. In certain embodiments, the RSAI from a first UE (i.e. a controlling UE) can be transmitted as a unicast message to a single UE. It is noted that the RSAI for a controlling UE can be received by controlled UEs as well as other controlling UEs.

FIG. 15 illustrates an example 1500 of the timing of the RSAI determination and transmission procedure according to embodiments of the present disclosure. The example 1500 of FIG. 15 is for illustration only and other embodiments can be used without departing from the scope of the present disclosure.

As illustrated in FIG. 15, the example 1500 is of the timing of the RSAI determination and transmission procedure. Other examples are described in this disclosure. For example, in slot n, the controlling UE determines the RSAI. Slot m includes a resource of the initial HARQ transmission of RSAI. In some examples, the slot n is left for UE implementation, in other examples, slot n is determined relative to slot m.

In certain embodiments, the RSAI is determined based on sidelink transmissions monitored during a "sensing window for RSAI" as shown in FIG. 15. The timing of "sensing window for RSAI" relative to slot n and/or slot m is described in FIG. 18 and in FIG. 19, which are described in greater detail below.

In certain embodiments, the RSAI is determined based on sidelink transmissions monitored during a "sensing window for RSAI" and candidate resources can be determined in a "candidate window of RSAI" (e.g., resource selection window in the controlled UE) as shown in FIG. 15. The timing of "sensing window for RSAI" relative to slot n and/or slot m, and the timing of "candidate window of RSAI" relative to slot n and/or slot m are described in FIG. 18 and in FIG. 19, which are described in greater detail below.

A UE receiving the RSAI can provide HARQ feedback to the UE transmitting RSAI. For example, in case of unicast traffic, a positive HARQ acknowledgement (ACK) is provided by the UE receiving the RSAI if the RSAI message is successful decoded and received, otherwise a negative acknowledgement (NACK) can be provided (after receiving the corresponding PSCCH). In case of groupcast traffic with HARQ-ACK reporting option (1), a UE receiving RSAI provides a negative acknowledgement (NACK) if it cannot successfully decode the RSAI message (and after receiving the corresponding PSCCH). In case of groupcast traffic with HARQ-ACK reporting option (2), a positive HARQ acknowledgement (ACK) is provided by the UE receiving the RSAI if the RSAI message is successful decoded and received, otherwise a negative acknowledgement (NACK) can be provided (after receiving the corresponding PSCCH).

In case of broadcast traffic, a UE can repeat a same RSAI message N times to improve the decodability of the RSAI message at a UE receiving RSAI. In some cases, N can be one, such as a single RSAI transmission for a same RSAI message. In other cases N can be larger than one, such as multiple RSAI transmissions for a same RSAI message. Additionally, N can be fixed in system specifications, or it can be (pre-)configured and/or updated by higher layer and/or L1 control signaling.

Time Domain Configuration and Triggering of Sidelink Resource Message (Component 3)

Figure 16:
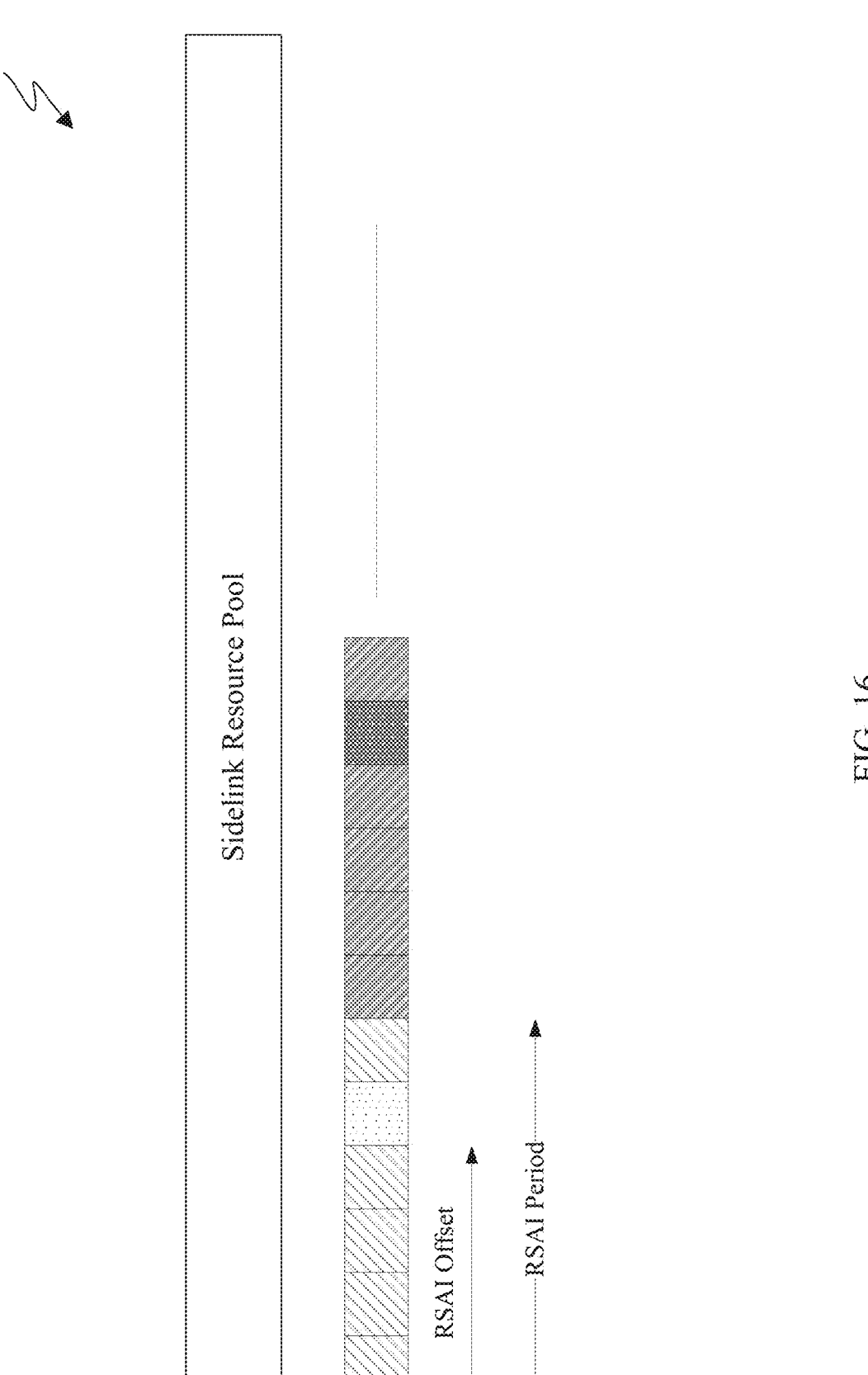
FIG. 16 illustrates an example of a period and an offset within the period according to embodiments of the present disclosure.

FIG. 16 illustrates an example 1600 of a period and an offset within the period according to embodiments of the present disclosure. The example 1600 of FIG. 16 is for illustration only and other embodiments can be used without departing from the scope of the present disclosure.

In certain embodiments, (referred to as Example 3.1), the time domain resources the controlling UE uses to send the RSAI to the controlled UE is configured by higher layers, (such as by RRC signaling and/or is pre-configured). In one example, the configuration can be by the gNB. In another example, the configuration can be by another UE (e.g. road side unit (RSU) or UE-group leader). The configuration can include a period and an offset within the period as described in the example 1600 of FIG. 16. The period and/or the offset can be configured using (i) time units (such as seconds, milli-seconds, and the like), (ii) physical slots, (iii) logical slots, or (iv) any combination thereof. It is noted that physical slots, include all slots numbered sequential, while logical slots include only slots that can be allocated to sidelink (such as uplink slots, or slots with enough uplink symbols for sidelink transmission) numbered sequentially, or logical slots are slots within a SL resource pool.

Furthermore, the configuration can include a sidelink resource pool for the transmission of RSAI.

For one example, the resource pool for the transmission of the RSAI can be the same as the resource pool used for sidelink resources indicated by the RSAI. For another example, the resource pool for the transmission of the RSAI can be a separate resource from the resource pool used for sidelink resources indicated by the RSAI. For yet another example, the resources for RSAI transmission are not included in any sidelink resource pool, but are pre-configured or configured by higher layers, e.g. by configuring a period and an offset within that period.

In certain embodiments, a higher layer parameter, such as a RRC parameter or a pre-configured parameter, indicates whether a resource pool used for the transmission of the RSAI is same as the resource pool used for the sidelink resources indicated by the RSAI.

In certain embodiments, (referred to as Example 3.2), the sidelink resources used for the transmission of RSAI are pre-reserved, pre-allocated, or pre-determined for RSAI transmission. For example, the UE transmitting the RSAI does not perform sensing and sidelink resource selection when transmitting the RSAI. The UE receiving the RSAI, can know the location of the resources used for RSAI transmission through higher layer configuration or pre-configuration. Alternatively, the UE receiving the RSAI is not configured or pre-configured with the RSAI sidelink resources, as such the UE receiving the RSAI monitors the sidelink resources of the sidelink resource pool used for transmitting the RSAI transmission to detect and receive the RSAI.

For another example, the periodicity of the RSAI can be configured or pre-configured to the UE receiving the RSAI, but the offset is not configured or pre-configured. As such, once the UE receiving the RSAI detects a first RSAI transmission, subsequent transmissions are received after the (pre-)configured period.

The UE receiving the RSAI transmission can be a controlled UE. The UE receiving the RSAI transmission can be another controlling UE.

In certain embodiments, (referred to as Example 3.3), the sidelink resources used for the transmission of RSAI are not pre-reserved, pre-allocated, nor pre-determined for the RSAI transmission. The UE transmitting the RSAI performs sensing and resource selection to select and reserve resources for the transmission of RSAI. The UE transmitting the RSAI can be (pre-)configured a period for subsequent transmissions of the RSAI. The UE transmitting the RSAI can indicate in the SCI (Sidelink Control Information) of a corresponding RSAI transmission, the corresponding "Resource Reservation Period". The "Resource Reservation Period" can assist a UE receiving the RSAI in determining the resources of the next RSAI transmission from a same UE.

Time Domain Behavior of Resource Selection Assistance Information (Component 4)

In certain embodiments, (referred to as Example 4.1), the RSAI transmission is (pre-)configured, according to the description of component 3, above, to be transmitted periodically.

For example (denoted as Example 4.1.1), according to Example 3.2, described above, the resources for a periodic RSAI are reserved by (pre-)configuration.

For another example, (denoted as Examine 4.1.2) according to Example 3.3, described above, the resources for a periodic RSAI are not reserved by (pre-)configuration, but a period is (pre-)configured.

In certain embodiments, (referred to as Example 4.2), the RSAI transmission is (pre-)configured according, to the description of component 3, above, to be semi-persistent. An activation command can start the RSAI transmission according to the (i) (pre-)configured sidelink resource pool, (ii) RSAI period, (iii) RSAI offset, (iv) sidelink sensing and resource selection, (v) gNB/TRP/eNB scheduling, or (vi) any combination thereof. A deactivation command can stop the RSAI transmission.

For example, (denoted as Example 4.2.1), according to Example 3.2, which is described above, the resources for a semi-persistent RSAI are reserved by (pre-)configuration.

For example, (denoted as Example 4.2.2), according to Example 3.3, which is described above, the resources for a semi-persistent RSAI are not reserved by (pre-)configuration, but a period is (pre-)configured.

In some embodiments the activation and deactivation commands can be triggered by the controlled UE requesting the RSAI via PC5 (sidelink) MAC CE. In some embodiments the activation and deactivation commands can be triggered by another sidelink UE, for example this can be a Road Side Unit (RSU), a group leader (e.g., of a platoon of sidelink UEs), or any other sidelink UE, via PC5 (sidelink) MAC CE. In some embodiments the activation and deactivation commands can be triggered by a gNB or a TRP or eNB via Uu interface MAC CE. In some embodiments the activation and deactivation commands can be triggered by the controlled UE requesting the RSAI via sidelink L1 control channel. In some embodiments the activation and deactivation commands can be triggered by another sidelink UE, for example this can be an RSU, a group leader (e.g., of a platoon of sidelink UEs), or any other sidelink UE, via sidelink L1 control channel. In some embodiments the activation and deactivation commands can be triggered by a gNB or a TRP or eNB via Uu L1 control channel.

Some or all of the following configuration fields for a semi-persistent RSAI transmission can be (pre-)configured, included in an activation command, updated by an activation command, or any combination thereof. For example, a configuration field for a semi-persistent RSAI transmission can be the sidelink resource pool for the RSAI transmission. For another example, a configuration field for a semi-persistent RSAI transmission can be the period of the RSAI transmission. For another example, a configuration field for a semi-persistent RSAI transmission can be the offset within the period of the RSAI transmission. For another example, a configuration field for a semi-persistent RSAI transmission can be the sub-channel number(s) of the RSAI transmission within a sidelink resource pool. For another example, a configuration field for a semi-persistent RSAI transmission can be the priority of the RSAI sidelink transmission. For another example, a configuration field for a semi-persistent RSAI transmission can be the priority of the sidelink transmission from a controlled UE for which resources are included in the RSAI. For another example, a configuration field for a semi-persistent RSAI transmission can be the packet delay budget (PDB) of the transmission from a controlled UE. In case of multiple transmissions from the controlled UE, the PDB can refer to the first transmission. In some cases, this value can be set to infinity. For yet another example, a configuration field for a semi-persistent RSAI transmission can be timing parameters as described in FIG. 18 and FIG. 19 in greater detail below.

Figure 17:
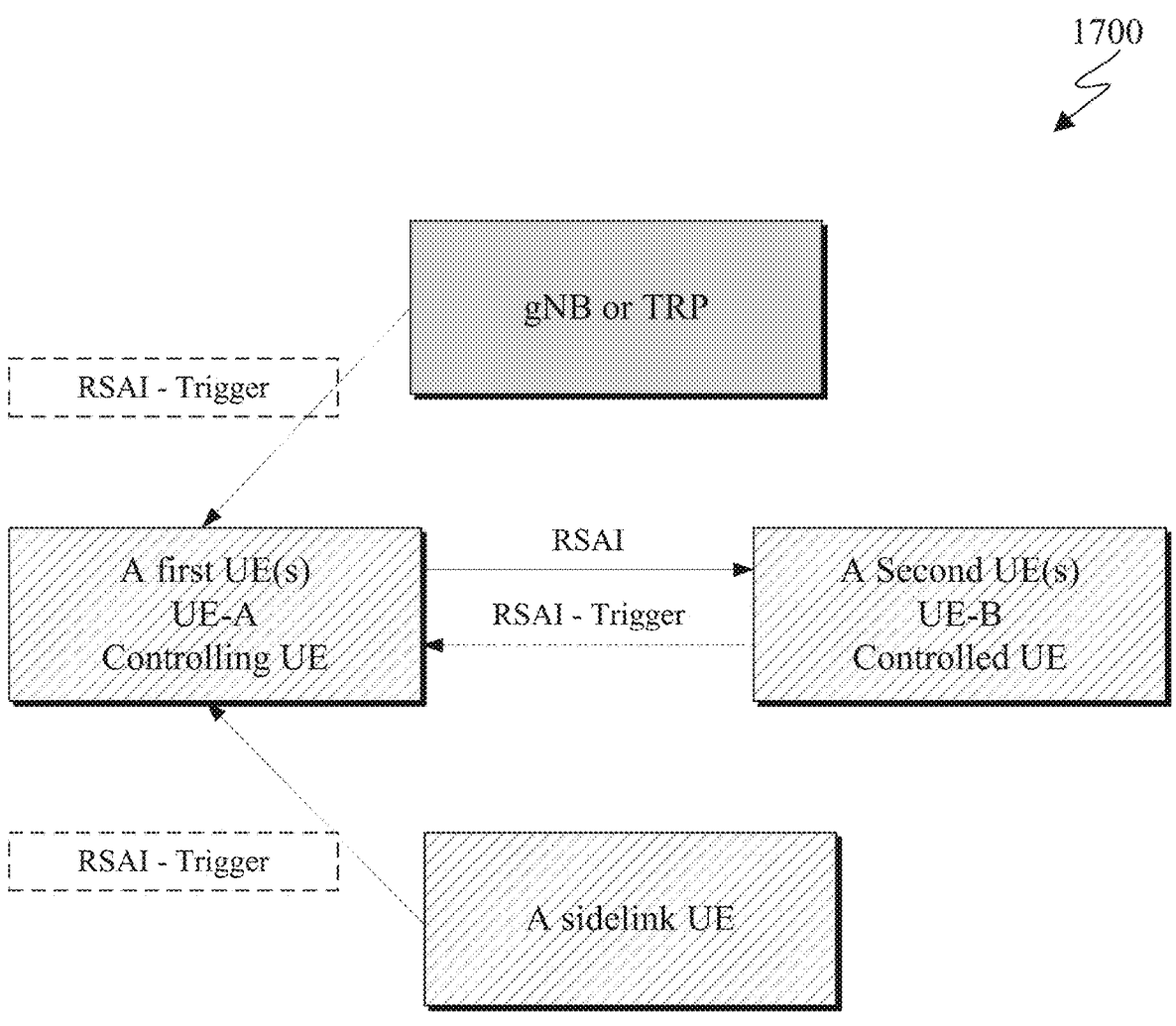
FIG. 17 illustrates an example of a UE that is triggered to transmit RSAI according to embodiments of the present disclosure.

FIG. 17 illustrates an example of the use of RSAI in a network 1700 including UEs according to embodiments of the present disclosure. The network 1700 of FIG. 17 is for illustration only and other embodiments can be used without departing from the scope of the present disclosure.

In certain embodiments (referred to as Example 4.3), the controlling UE is triggered to transmit RSAI, i.e. aperiodic RSAI transmission. This is illustrated in the example 1700 of the FIG. 17.

The source of the trigger can be the controlled UE requesting the RSAI via PC5 (sidelink) MAC CE. The source of the trigger can also be another sidelink UE, for example this can be an RSU, a group leader (e.g., of a platoon of sidelink UEs), or any other sidelink UE, via PC5 (sidelink) MAC CE. The source of the trigger further also be a gNB or a TRP or eNB via Uu interface MAC CE. Additionally, the source of the trigger can be the controlled UE requesting the RSAI via sidelink L1 control. The source of the trigger can also be another sidelink UE, for example this can be an RSU, a group leader (e.g., of a platoon sidelink UEs), or any other sidelink UE, via sidelink L1 control. The source of the trigger can further be a gNB or a TRP or eNB via Uu L1 control.

Some or all of the following configuration fields for an aperiodic RSAI transmission can be (pre-)configured, included in an aperiodic RSAI command, updated by an aperiodic RSAI command, or any combination thereof. For example, a configuration field for an aperiodic RSAI command can be the sidelink resource pool for the RSAI transmission. For another example, a configuration field for an aperiodic RSAI command can also be the number N1 of RSAI transmission messages. There could be one RSAI transmission message (i.e. N1=1), or N1 RSAI transmission messages. For another example, a configuration field for an aperiodic RSAI command can further be the period of the RSAI messages. This is the period between two consecutive RSAI messages when N1 is greater than 1. For another example, a configuration field for an aperiodic RSAI command can also be a time period during which RSAI messages are transmitted, after the trigger, in addition to the period between two consecutive messages. For another example, a configuration field for an aperiodic RSAI command can additionally be the sub-channel number(s) of the RSAI transmission within a sidelink resource pool. For another example, a configuration field for an aperiodic RSAI command can be the priority of the RSAI sidelink transmission. For another example, a configuration field for an aperiodic RSAI command can be the priority of the sidelink transmission from a controlled UE for which resources are included in the RSAI. For another example, a configuration field for an aperiodic RSAI command can be the packet delay budget (PDB) of the transmission from a controlled UE. In case of multiple transmissions from the controlled UE, the PDB can refer to the first transmission. In some cases, this value can be set to infinity. For yet another example, a configuration field for an aperiodic RSAI command can be the timing parameters as described in FIG. 18 and FIG. 19 in greater detail below.

Timing Parameters of Resource Selection Assistance Information (Component 5)

Figure 18:
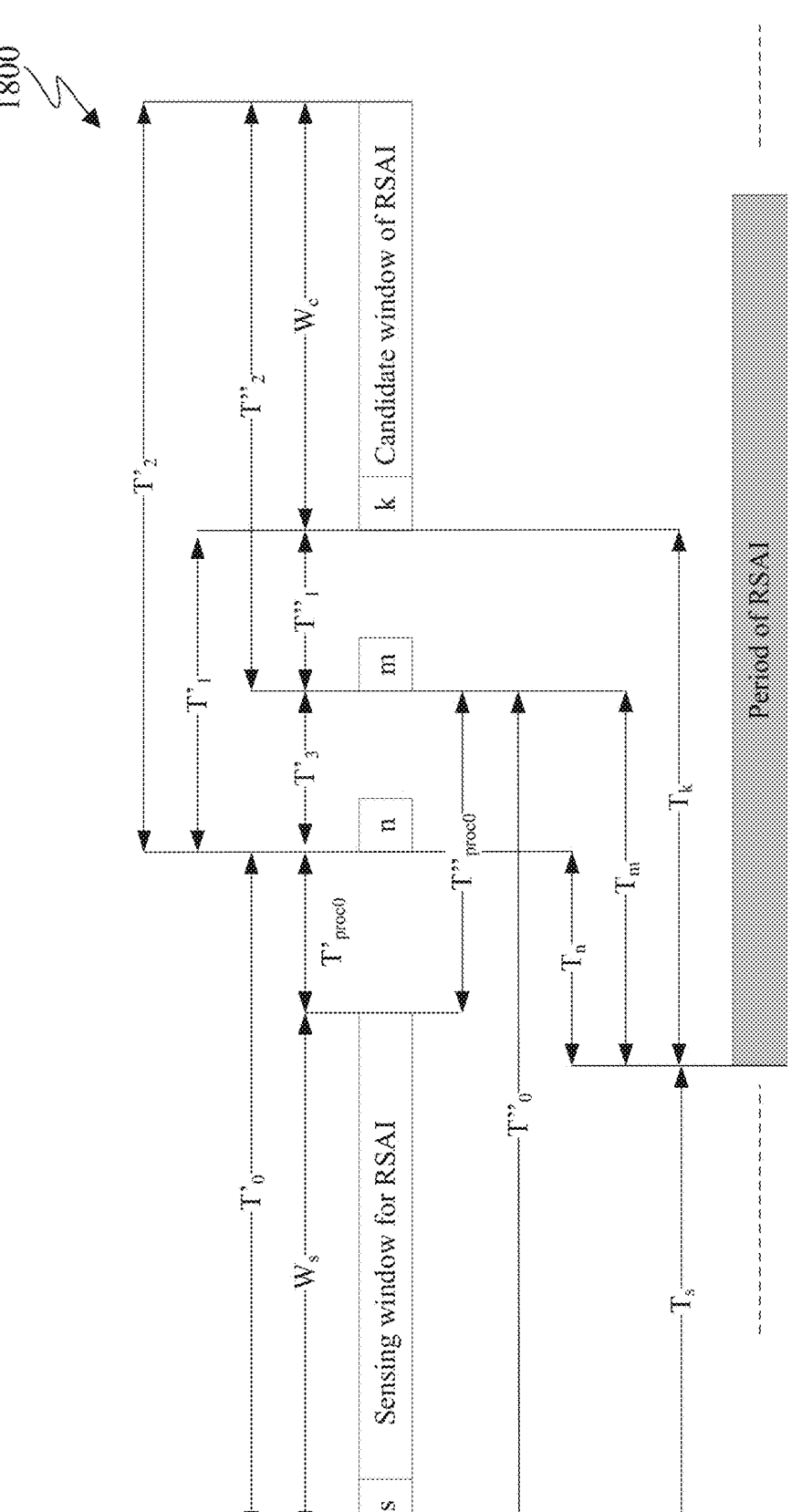
FIGS. 18 and 19 illustrate timing parameters according to embodiments of the present disclosure.

FIG. 18 illustrates example timing diagram 1800 of a timing parameter according to embodiments of the present disclosure. The example timing diagram 1800 is for illustration only and other embodiments can be used without departing from the scope of the present disclosure.

As shown in FIG. 18, the example timing diagram 1800 illustrates the timeline for the determination of the RSAI and the transmission of the RSAI, when the resource for RSAI transmission has been selected or reserved. Slot m is used for RSAI transmission.

For example (denoted as Example 5.1.1), the resource for RSAI transmission is pre-reserved or pre-allocated or pre-determined by (pre-)configuration.

For another example (denoted as Example 5.1.2), the resource for RSAI transmission is selected/re-selected or reserved, such as during resource allocation mode 2, as described in Rel-16.

For yet another example (denoted as Example 5.1.3), the resource for RSAI is scheduled by a gNB/TRP/eNB for such as during resource allocation mode 1, as described in Rel-16.

The Example 1800 of FIG. 18 illustrates the timing relation between: (i) sensing window for determination of RSAI, (ii) candidate window of RSAI (e.g., resource selection window in controlled UE), (iii) slot n, where the RSAI can be determined, (iv) slot m, where the RSAI is initially transmitted by the controlling UE (initial HARQ transmission), (v) slot k, the first slot of a candidate resource window of RSAI, and (vi) slot s, the first slot of a sensing window for RSAI.

A sufficient subset of the timing parameters depicted in FIG. 18 can be (pre-)configured to determine the time of each window and slot as illustrated in FIG. 18. It should also be apparent that other timing values related to the values of FIG. 18 can be (pre-)configured to determine the time of each window and slot as illustrated in FIG. 18.

Furthermore, the timing parameters can be updated through higher layer signaling, i.e. RRC signaling and/or MAC CE signaling as well as through L1 control signaling, wherein the higher layer signaling and/or the L1 control signaling can be on the Uu interface (i.e. between a UE and a base station/TRP) or sidelink interface. The Uu interface can be for NR or LTE or other cellular/wireless standards.

Some of the timing parameters can be determined based on a UE capability, a numerology (e.g., of the SL interface), or both. For example, $T''_{proc0}$ can depend on a UE capability and/or the numerology of the sidelink transmission. Other parameters that can depend on a UE capability and/or a numerology include, $T''_{proc0}$, $T'_3$, $T'_1$, $T''_1$.

Some timing parameters can be provided in units of time, (such as in seconds or milli-seconds), while other timing parameters can be provided in units of physical slots depending on the numerology of the sidelink, while other timing parameters can be provided in logical slots. The conversion of logic slots to physical time and vice versa is described in Equation (2), below.

$$T'_{logical} = \left\lceil \frac{T'_{max}}{10240 \text{ ms}} \times T_{ms} \right\rceil \qquad (2)$$

Where, $T_{ms}$ is a period in milli-seconds, $$T'_{logical}$$

is the corresponding number of logical slots, and $T'_{max}$ is the number of logical slots within a SL resource pool within a 20 ms period.

In FIG. 18, slot m is the slot for initial HARQ transmission of RSAI. The duration between slot m and slot n (i.e. $T'_3$) can be (pre-)configured and updated by higher layer and/or L1 control signaling or derived from other timing parameters. It is noted that, $T'_3$ can be in (i) units of time, (such as in seconds or milliseconds), (ii) units of physical slots corresponding to the sidelink numerology, or (iii) units of logical slots.

In one example, the controlling UE (UE-A) determines the RSAI for the initial HARQ transmission. In case of a re-transmission, due to a NACK or due to not receiving an ACK, the UE retransmits the same RSAI.

In another example, the controlling UE (UE-A) determines the RSAI for the initial HARQ transmission. In case of a re-transmission, due to a NACK or due to not receiving an ACK, the UE updates the RSAI based on the most recent sensing information available, and the UE transmits the updated RSAI.

For example (denoted as Example 5.2.1), the following parameters can be (pre-)configured, updated through higher layer signaling, and/or L1 control signaling: (i) a slot within a period for transmission of RSAI, i.e. $T_m$, (ii) the sensing window for RSAI relative to slot m, i.e. $T''_{proc0}$ and $T''_0$, and (iii) the candidate window of RSAI relative to slot m, i.e. $T''_1$ and $T''_2$. In this example (Example 5.2.1), slot n is not determined, and can be left for UE implementation.

For another example (denoted as Example 5.2.2), the following parameters can be (pre-)configured, updated through higher layer signaling, and/or L1 control signaling: (i) a slot within a period for transmission of RSAI, i.e. $T_m$, (ii) a starting slot, relative to the start of an RSAI period for the candidate window of RSAI, i.e. $T_k$, (iii) candidate window of RSAI duration $W_c$, (iv) a starting slot, relative to the start of an RSAI period for the sensing window for RSAI, i.e. $T_s$, and (v) sensing window for RSAI duration $W_s$. In this example (Example 3.2.2), slot n is not determined, and can be left for UE implementation.

For another example (denoted as Example 5.2.3), the following parameters can be (pre-)configured, updated through higher layer signaling, and/or L1 control signaling: (i) a slot within a period for transmission of RSAI, i.e. $T_m$, (ii) the duration $T'_3$ between the slot for determination of RSAI (i.e. slot n) and the slot for transmission of RSAI (i.e. slot m), (iii) the sensing window for RSAI relative to slot n, i.e. $T'_{proc0}$ and $T'_0$, and (iv) the candidate window of RSAI relative to slot n, i.e. $T'_1$ and $T'_2$. In this example (Example 5.2.3) slot n is (pre-)configured.

In certain embodiments, a different set of timing parameters are (pre-)configured or updated, and the remaining timing parameters can be derived from the set of (pre-)configured or updated timing parameters.

Figure 19:
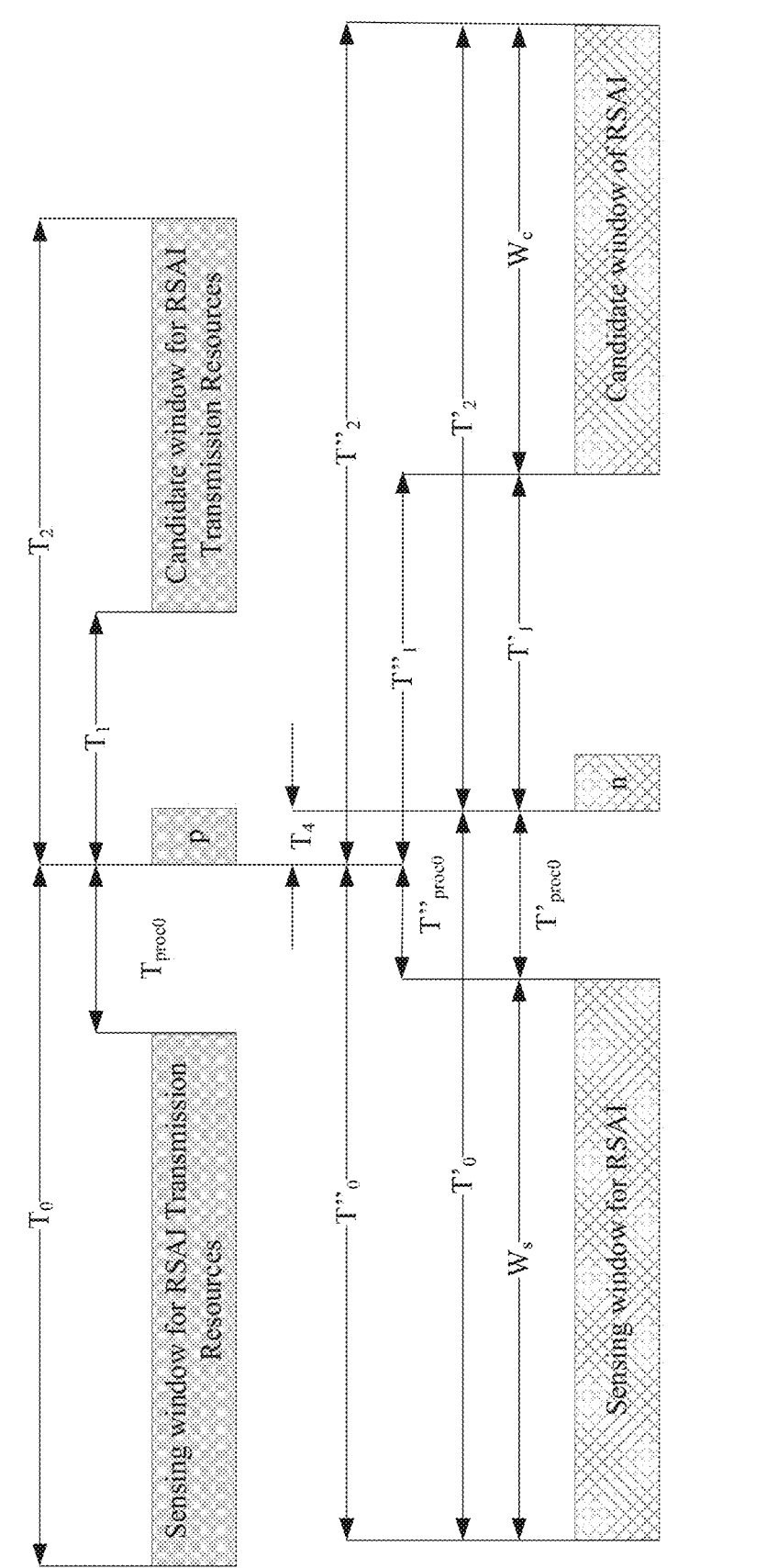

FIG. 19 illustrate example timing diagram 1900 of a timing parameter according to embodiments of the present disclosure. The example timing diagram 1900 is for illustration only and other embodiments can be used without departing from the scope of the present disclosure.

The example timing diagram 1900 of FIG. 19 describes the determination of the RSAI and the transmission of the RSAI, when the resource for RSAI transmission has not been selected or reserved. In particular, FIG. 19 illustrates the timing relation between: (i) sensing window for determination of RSAI, (ii) candidate window of RSAI, (iii) slot n, where the RSAI can be determined, (iv) sensing window for determination of the RSAI transmission resource, (v) candidate window for the RSAI transmission resource, and (vi) slot p, where the candidate subset for the RSAI transmission resources is determined.

It should be noted that not all timing relations are shown in FIG. 19, and that additional timing relations could include, but are not limited to (i) the time between the start of the sensing window for RSAI transmission resources and the start of the sensing window for RSAI, (ii) the time between the start of the candidate window for RSAI Transmission Resources and the start of the candidate window of RSAI (e.g., resource selection window in controlled UE), and (iii) the time between the start of the candidate window for RSAI Transmission Resources and slot n where the RSAI is determined.

A sufficient subset of the timing parameters depicted in FIG. 19, or other timing parameters as described above, can be (pre-)configured to determine the time of each window and slot as illustrated in FIG. 19. Furthermore, the timing parameters can be updated through higher layer signaling, i.e. RRC signaling and/or MAC CE signaling as well as through L1 control signaling, wherein the higher layer signaling and/or the L1 control signaling can be on the Uu interface (i.e. between a UE and a base station/TRP) or sidelink interface. The Uu interface can be for NR or LTE or other cellular/wireless standards.

Some of the timing parameters can be determined based on a UE capability, a numerology (e.g., of the SL interface), or both. For example, $T'_{proc0}$ can depend on a UE capability and/or the numerology of the sidelink transmission. Other parameters that can depend on a UE capability and/or a numerology include, $T'_1$ and $T''_1$.

Some timing parameters can be provided in units of time, (such as in seconds or milli-seconds), while other timing parameters can be provided in units of physical slots depending on the numerology of the sidelink, while other timing parameters can be provided in logical slots. The conversion of logic slots to physical time and vice versa is described in Equation (2), above.

Some of the timing parameters of FIG. 19 can be the same or can be (pre-)configured and/or updated separately. For example, $T_{proc0}$ and $T'_{proc0}$ can be the same or separate parameters.

In FIG. 19, slot n can be a same slot as slot p. Alternatively slot n and slot p can be different slots. When slot n and slot p are different, slot n can be before slot p or slot n can be after slot p. In this example, slot p is the slot where the subset of candidate resources for RSAI transmission are determined. The duration between slot p and slot n, i.e. $T_4$ and can be (pre-)configured and updated by higher layer and/or L1 control signaling or derived from other timing parameters. Where, $T_4$ can be in units of (i) time (such as in seconds or milliseconds), (ii) units of physical slots corresponding to the sidelink numerology, or (iii) units of logical slots.

For another example, the following parameters can be (pre-)configured and/or updated through higher layer signaling and/or L1 control signaling: (i) the sensing window for RSAI relative to slot p, i.e. $T''_{proc0}$ and $T''_0$, and (ii) the candidate window of RSAI relative to slot p, i.e. $T''_1$ and $T''_2$. In this example, slot n is not determined, and can be left for UE implementation.

For yet another example, the following parameters can be (pre-)configured and/or updated through higher layer signaling and/or L1 control signaling: (i) the duration $T_4$ between the slot for determination of RSAI (i.e. slot n) and the slot where the subset of candidate resources for RSAI transmission are determined (i.e. slot p), (ii) the sensing window for RSAI relative to slot n, i.e. $T'_{proc0}$ and $T'_0$, and (iii) the candidate window of RSAI relative to slot n, i.e. $T'_1$ and $T'_2$. In this example, slot n is (pre-)configured relative to slot p.

In certain embodiments, a different set of timing parameters can be (pre-)configured or updated, and the remaining timing parameters can be derived from the set of (pre-)configured or updated timing parameters.

Figure 20:
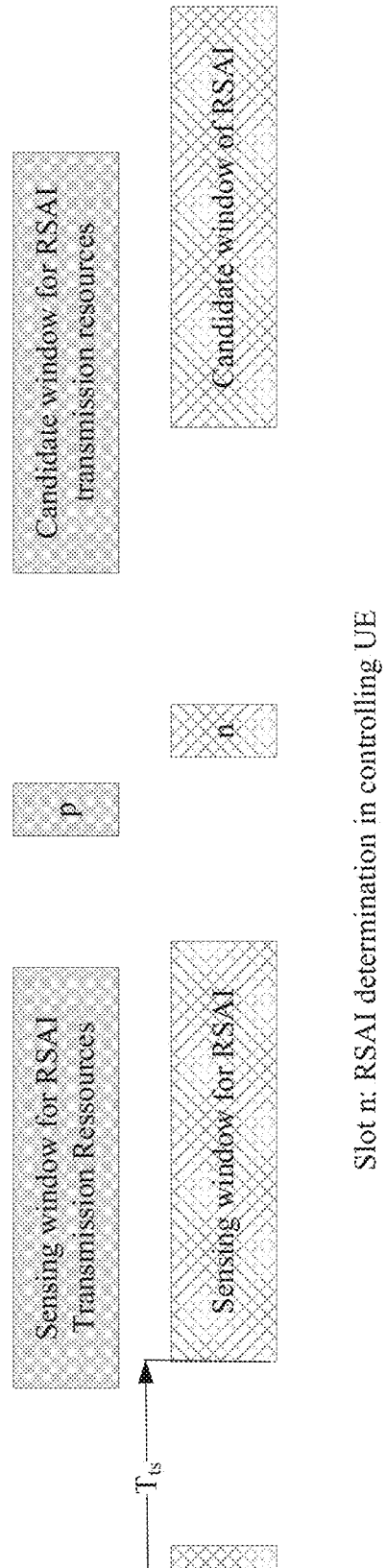
FIGS. 20 and 21 illustrate examples of an aperiodic RSAI scheme according to embodiments of the present disclosure.
Figure 21:
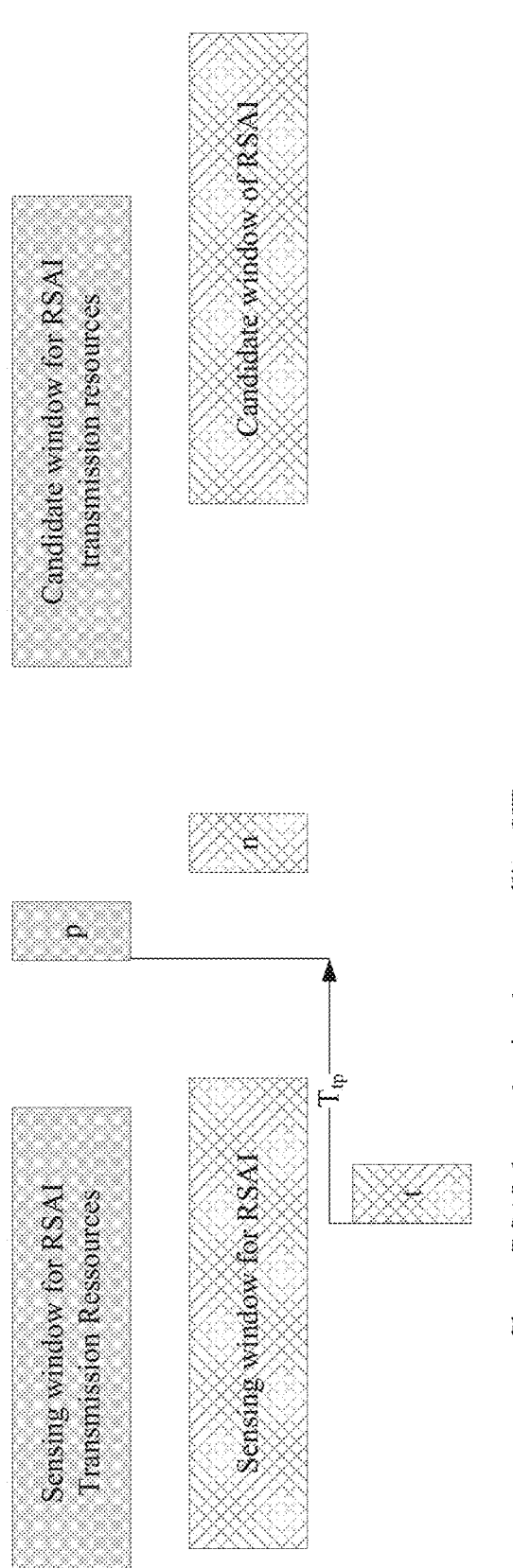

FIGS. 20 and 21 illustrate examples of an aperiodic RSAI schemes according to embodiments of the present disclosure. In particular, FIG. 20 illustrates example scheme 2000 while FIG. 21 illustrates example scheme 2100. The example schemes 2000 and 2100 are for illustration only and other embodiments can be used without departing from the scope of the present disclosure.

The example scheme 2000 of FIG. 20 is an example of an aperiodic RSAI scheme. In particular, the example scheme 2000 shows a timing relation between a trigger slot "t" and various windows and slots associated with the RSAI determination procedure. In example scheme 2000, slot "t" is before the start of the "sensing window for RSAI", i.e. the controlling UE waits for a trigger to start sensing the sidelink for the purpose of providing an aperiodic RSAI. The time duration $T_{ts}$ is the time between slot "t" and the start of the "sensing window for RSAI". This time duration can be specified in the system specifications (e.g. it can depend on UE capability and/or sidelink numerology) and/or can be (pre-)configured and/or updated by higher layer signaling and/or L1 control signaling, alternatively this time can be provided in the trigger message. Alternatively, the trigger message can provide a start time for the "sensing window for RSAI". The timing parameters between the remaining blocks can follow the timing parameters of FIG. 19. In this example, the source of trigger is as described in example 1700 of FIG. 17. It should be noted other timing parameters can be provided instead of $T_{ts}$, and the start of the "sensing window for RSAI" can be determined based on these timing parameters. For example, the trigger message can provide or determine the slot or offset to the slot of the SL transmission containing the RSAI.

The example scheme 2100 of FIG. 21 is another example of an aperiodic RSAI scheme. In particular, the example scheme 2100 shows a timing relation between a trigger slot "t" and various windows and slots associated with the RSAI determination procedure. In this example, slot "t" can be after the start of the "sensing window for RSAI", i.e. the controlling UE is sensing the sidelink for the purpose of providing RSAI, or other purposes, even before a trigger for an aperiodic RSAI. The time duration $T_{tp}$ is the time between slot "t" and slot p where the subset of resources for RSAI transmission in the "candidate window for RSAI transmission resources" is determined. As an example, this time duration can be specified in the system specifications (e.g. it can depend on UE capability and/or sidelink numerology) can be (pre-)configured and/or updated by higher layer signaling and/or L1 control signaling, alternatively this time can be provided in the trigger message. Alternatively, other timing parameters can be configured/specified between slot "t" and other slots or windows in FIG. 21, and time between slot "t" and slot p or any other slot can be determined based on that. For example, the trigger message can provide or be used to determine the slot or offset to the slot of the SL transmission containing the RSAI.

Procedure for Determination and Transmission Resource Selection Assistance Information (Component 6)

According to embodiments of the present disclosure, a procedure in the controlling UE includes optionally determining the resource used for the transmission of the RSAI. This step is required if the resource for the transmission of RSAI is not pre-allocated or pre-configured, or schedule by a gNB/TRP/eNB e.g. example 3.3, described above. A procedure in the controlling UE also includes determining the RSAI to be sent from a controlling UE.

The procedure for resource selection in sidelink resource allocation mode 2, is a two-step procedure. First, a determination of the subset of resources to be reported to higher layers within the "candidate window for RSAI transmission resources". When this procedure is triggered in a slot p as depicted in FIG. 19, the corresponding sensing window extends between $[T_0, T_{proc0}]$ before slot p, while the candidate window for RSAI Transmission resources extends between $[T_1, T_2]$ after slot p. This procedure follows TS 38.214. Second, a determination of a resource within the set of identified resources in the "candidate window for RSAI transmission resources". This follows the Rel-16 procedure described in 38.321. It is noted that the selected resource can be re-evaluated or pre-empted following the procedure described in 38.214 and 38.321.

For example (denoted as Example 6.0.1), the RSAI is determined in a slot n, the corresponding "sensing window for RSAI" extends between $[T'_0, T'_{proc0}]$ before slot n, while the corresponding "candidate window of RSAI" extends between $[T'_1, T'_2]$ after slot n as depicted in FIG. 19.

For another example (denoted as Example 6.0.2), the RSAI is determined based on slot p, where the subset of resources to be reported to higher layers within the "candidate window for RSAI transmission resources" is determined. The corresponding "sensing window for RSAI" extends between $[T''_0, T''_{proc0}]$ before slot p, while the corresponding "candidate window of RSAI" extends between $[T''_1, T''_2]$ after slot p as depicted in FIG. 19.

For another example (denoted as Example 6.0.3), which can be in addition or Example 6.0.1 or Example 6.0.2, the RSAI is determined or updated in a slot n, the corresponding "sensing window for RSAI" extends between $[T'_0, T'_{proc0}]$ before slot n, while the corresponding "candidate window of RSAI" extends between $[T'_1, T'_2]$ after slot n as depicted in FIG. 18. The RSAI can be initially determined according to Example 6.0.1 or Example 6.0.2, and then updated (i.e. re-evaluated) once the slot for the transmission of the RSAI has been determined. In case a selected or reserved slot m is re-evaluated or pre-empted to slot m', for example following re-evaluation and pre-emption procedures of Rel-16, the procedure described in this example is repeated for slot m'.

For another example (denoted as Example 6.0.4), which can be in addition or Example 6.0.1 or Example 6.0.2, the RSAI is determined after slot m used for the transmission of RSAI has been selected or reserved as illustrated in FIG. 18. The corresponding "sensing window for RSAI" extends between $[T''_0, T''_{proc0}]$ before slot m, while the corresponding "candidate window of RSAI" extends between $[T''_1, T''_2]$ after slot m as depicted in FIG. 18. The RSAI can be initially determined according to Example 6.0.1 or Example 6.0.2, and then updated (i.e. re-evaluated) once the slot for the transmission of the RSAI has been determined. In case a selected or reserved slot m is re-evaluated or pre-empted to slot m', for example following the re-evaluation and pre-emption procedures of Rel-16, the procedure described in this example is repeated for slot m'.

The scenarios in Table 1 are considered in Examples 6.1 to 6.8, described below.

TABLE 1

| Scenario # | Scenario Description |
|---|---|
| 6.1 | Slot m (FIG. 18) including a resource for transmission of RSAI is known to a controlling UE. |
| | Slot n (FIG. 18) for determination of RSAI is indicated to a UE. |
| 6.2 | Slot m (FIG. 18) including a resource for transmission of RSAI is known to a controlling UE. |
| | Slot n (FIG. 18) for determination of RSAI is not indicated to a UE - left for UE implementation. |
| 6.3 | Slot p (FIG. 19) is the slot where a subset of resources to be reported to higher layers within the "candidate window for RSAI transmission resources" is determined. |
| | Slot n (FIG. 19) for determination of RSAI is indicated to a UE. |
| 6.4 | Slot p (FIG. 19) is the slot where a subset of resources to be reported to higher layers within the "candidate window for RSAI transmission resources" is determined. |
| | Slot n (FIG. 19) for determination of RSAI is not indicated to a UE - left for UE implementation. |
| 6.5 | In resource allocation mode 2, slot m (FIG. 18) including a resource initially selected for transmission of RSAI is known to a UE transmitting RSAI. |
| | Slot n (FIG. 18) for determination of RSAI is indicated to a UE. |

TABLE 1-continued

| Scenario # | Scenario Description |
|---|---|
| 6.6 | In resource allocation mode 2, slot m (FIG. 18) including a resource initially selected for transmission of RSAI is known to a UE transmitting RSAI. Slot n (FIG. 18) for determination of RSAI is not indicated to a UE - left for UE implementation. |
| 6.7 | In resource allocation mode 2, slot m (FIG. 18) including a resource actually used for transmission of RSAI is known to a UE transmitting RSAI. Slot n (FIG. 18) for determination of RSAI is indicated to a UE. |
| 6.8 | In resource allocation mode 2, slot m (FIG. 18) including a resource actually used for transmission of RSAI is known to a UE transmitting RSAI. Slot n (FIG. 18) for determination of RSAI is not indicated to a UE - left for UE implementation. |

Figure 22:
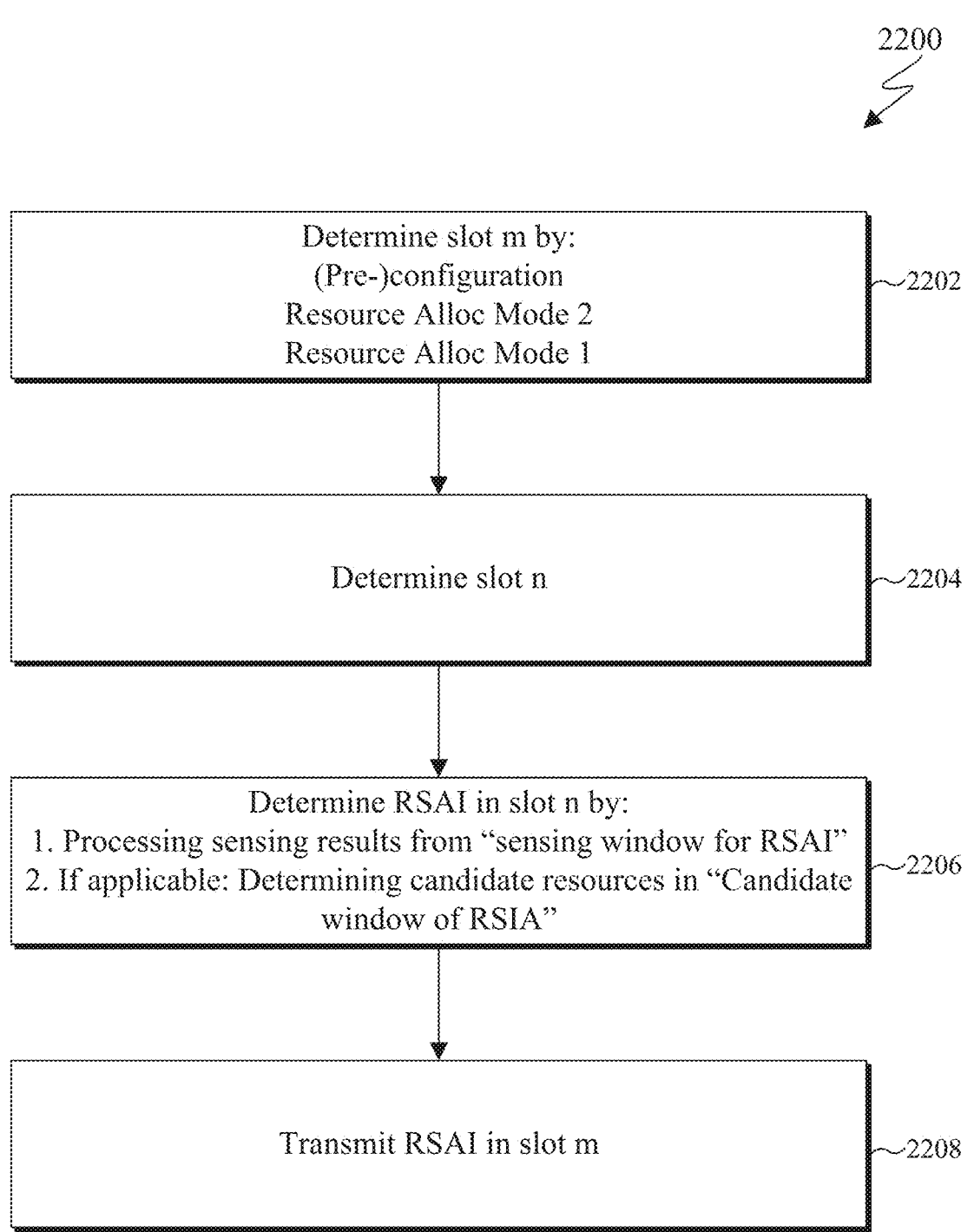
FIGS. 22, 23, 24, and 25 illustrate methods for determining and transmitting the RSAI by the controlling UE according to embodiments of the present disclosure.
Figure 23:
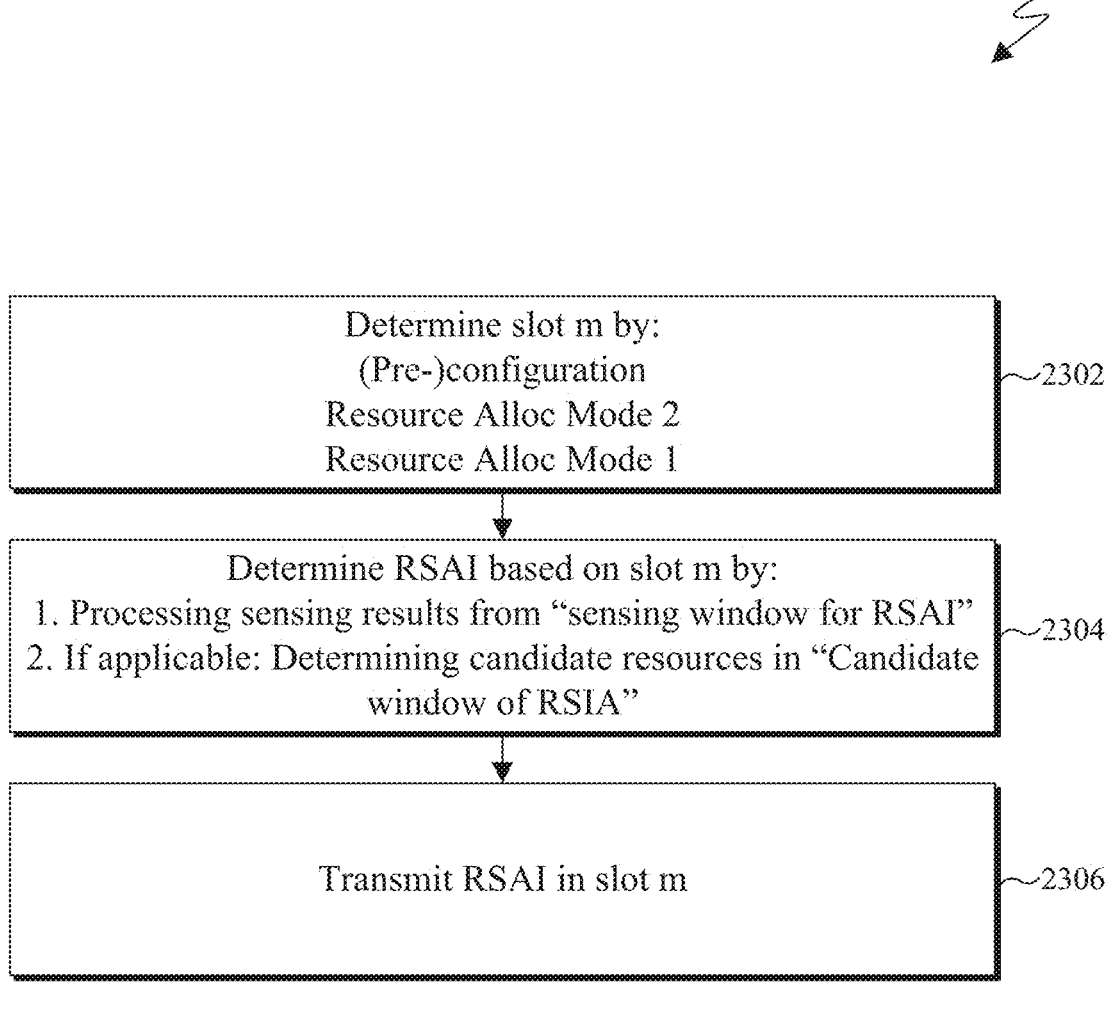
Figure 24:
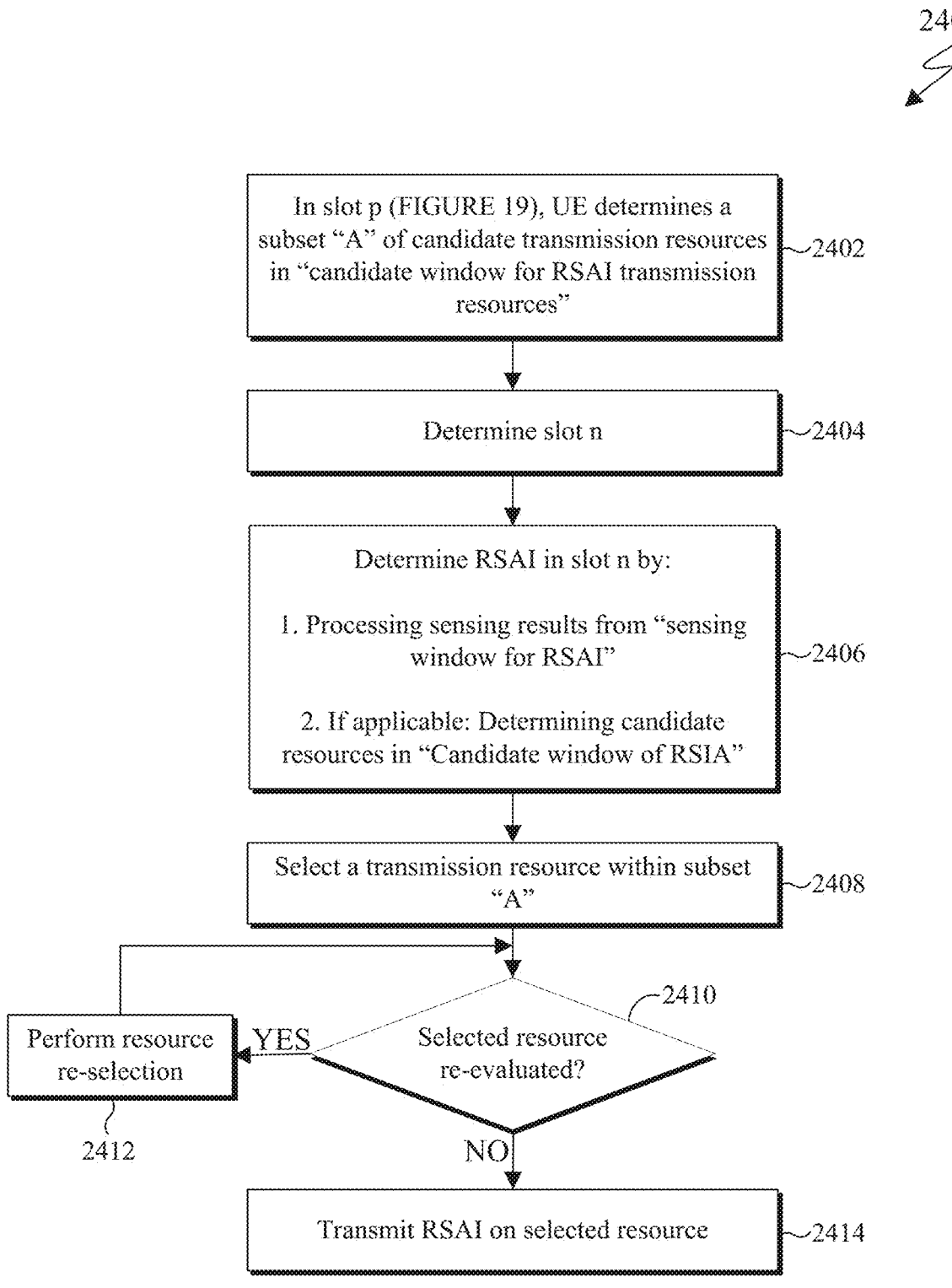
Figure 25:
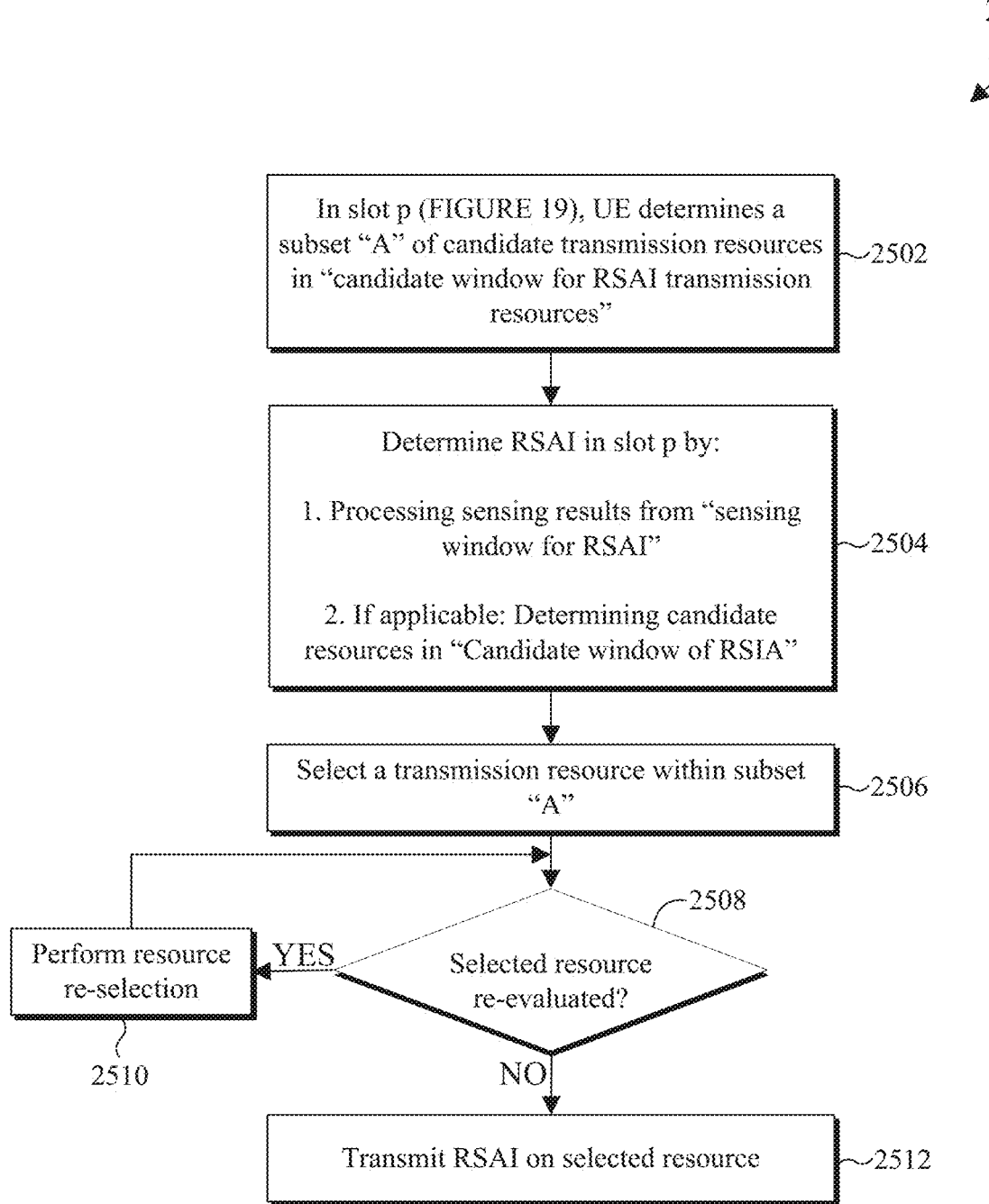

FIGS. 22, 23, 24, and 25 illustrate methods for determining and transmitting the RSAI by the controlling UE according to embodiments of the present disclosure. In particular, the FIG. 22 illustrates a method 2200, the FIG. 23 illustrates a method 2300, the FIG. 24 illustrates a method 2400, and the FIG. 25 illustrates a method 2500. For example, the steps of the methods 2200, 2300, 2400, and 2500 can be performed by the any of the UEs 111-116 of FIG. 1, such as the UE 116 of FIG. 3. The embodiments of FIGS. 22, 23, 24, and 25 are for illustration only and other embodiments can be used without departing from the scope of the present disclosure.

In certain embodiments (referred to as Example 6.1), the RSAI is transmitted in time slot m, as illustrated in FIG. 18. The slot m can be pre-reserved, pre-allocated, or pre-determined by pre-configuration as described in Example 5.1.1, above. The slot m can be selected or re-selected by resource allocation mode 2 as described in Example 5.1.2, above. The slot m can be scheduled by resource allocation model 1, such as described in Example 5.1.3, above. It is noted that a slot n, as illustrated in FIG. 18, is (pre-) configured or indicated to a controlling UE.

The method 2200 of FIG. 22 describes a procedure for the determination and transmission of the RSAI by the controlling UE. In step 2202 the slot m is determined by (pre-) configuration, resource allocation Mode 1 or resource allocation Mode 2. In step 2204, the slot n is determined. For example the time duration between slot m and slot n (i.e. T'$_3$) can be (pre-)configured or calculated from other timing parameters.

In step 2206 the RSAI in slot n is determined. For example, in slot n, the extent of the "sensing window for RSAI" is determined according to the timing parameters of FIG. 18. The sensing results from the "sensing window for RSAI" are processed. If the example of FIG. 15, for the "candidate window of RSAI", is applicable, the extent of the "candidate window of RSAI" is determined and the candidate resources within the "candidate window of RSAI" are determined. Any other RSAI fields are determined. In step 2208, the RSAI is transmitted in slot m.

In certain embodiments (referred to as Example 6.2), the RSAI is transmitted in time slot m, as illustrated in FIG. 18. In some embodiments, the slot m is pre-reserved or pre-allocated or pre-determined by pre-configuration as described in example 5.1.1. In some embodiments the slot m is selected or re-selected by resource allocation mode 2 as described in example 5.1.2. In some embodiments the slot m is scheduled by resource allocation model 1, as described in example 5.1.3. It is noted that slot n, as illustrated in FIG. 18, is not (pre-)configured nor indicated to a controlling UE.

The method 2300 of FIG. 23 describes the procedure for the determination and transmission of the RSAI by the controlling UE. In step 2302, the slot m is determined by (pre-)configuration, resource allocation Mode 1 or resource allocation Mode 2. In step 2304 the RSAI in slot m is determined. For example, the extent of the "sensing window for RSAI" is determined according to the timing parameters of FIG. 18, i.e. relative to slot m. The sensing results from the "sensing window for RSAI" are processed. If the example of FIG. 15, for the "candidate window of RSAI", is applicable, the extent of the "candidate window of RSAI" is determined, i.e. relative to slot m, and the candidate resources within the "candidate window of RSAI" are determined. Any other RSAI fields are determined. In this example, and following examples 5.2.1, and 5.2.2, slot n of FIG. 18 is not indicated to the UE, it is up to UE implementation to select a slot, or split the processing across multiple slots, for the determination of the RSAI. In step 2306, the RSAI is transmitted in slot m.

In certain embodiments, (referred to as Example 6.3), there is no pre-reserved, pre-allocated, nor pre-determined resource for the transmission of RSAI. The resource for the transmission of RSAI can be selected following the resource selection procedure of sidelink, for example according to resource allocation mode 2. Slot n, as illustrated in FIG. 19, is (pre-)configured or indicated to a controlling UE. The RSAI determined in slot n is transmitted regardless of the location of the selected resource for the transmission of RSAI.

The method 2400 of FIG. 24 describes the procedure for the determination and transmission of the RSAI by the controlling UE. In a slot p, a controlling UE determines, in step 2402, a subset "A" of resources to be reported to higher layers within the "candidate window for RSAI transmission resources."

In step 2404, slot n is determined. For example, the time duration between slot p and slot n (i.e. T$_4$) can be (pre-) configured or calculated from other timing parameters. In step 2406, the RSAI in slot n is determined. For example, in slot n, the extent of the "sensing window for RSAI" is determined according to the timing parameters of FIG. 9. The sensing results from the "sensing window for RSAI" are processed. If the example of FIG. 15, for the "candidate window of RSAI", is applicable, the extent of the "candidate window of RSAI" is determined and the candidate resources within the "candidate window of RSAI" are determined. Any other RSAI fields are determined.

In step 2408, a resource is selected for the transmission of the RSAI within subset "A" that has been determined in step 2402. In step 2410, a determination is made as to whether the sidelink resource selected for the transmission of RSAI is to be re-evaluated. In certain embodiments, the re-evaluation procedure is optionally enabled or disabled by (pre-)

configuration and/or can be activated or deactivated by higher layer signaling and/or L1 control signaling.

If the re-evaluated resource is not available, the controlling UE performs resource re-selection in step 2412 for the RSAI resource following the release 16 sidelink procedure for resource re-selection. If the re-evaluated resource is available, the controlling UE transmits RSAI in the selected resource, in step 2414.

In certain embodiments, (referred to as Example 6.4), there is no pre-reserved nor pre-allocated nor pre-determined resource for the transmission of RSAI. The resource for the transmission of RSAI can be selected following the resource selection procedure of sidelink, for example according to resource allocation mode 2. Slot n, as illustrated in FIG. 19, is not (pre-)configured nor indicated to a controlling UE. The RSAI determined based on slot p (of FIG. 19) is transmitted regardless of the location of the selected resource for the transmission of RSAI.

The method 2500 of FIG. 25 describes the procedure for the determination and transmission of the RSAI by the controlling UE. In a slot p, a controlling UE determines, in step 2502, a subset "A" of resources to be reported to higher layers within the "candidate window for RSAI transmission resources". Following the release 16 sidelink procedure for resource allocation mode 2. In step 2504, the RSAI in slot p is determined. The extent of the "sensing window for RSAI" is determined according to the timing parameters of FIG. 19, i.e. relative to slot p. The sensing results from the "sensing window for RSAI" are processed. If the example of FIG. 15, for the "candidate window of RSAI", is applicable, the extent of the "candidate window of RSAI" is determined, i.e. relative to slot p, and the candidate resources within the "candidate window of RSAI" are determined. Any other RSAI fields are determined. In this example, slot n of FIG. 19 is not indicated to the UE, it is up to UE implementation to select a slot, or split the processing across multiple slots, for the determination of the RSAI.

In step 2506, a resource is selected for the transmission of the RSAI within subset "A" that has been determined in step 2502. The resource can be selected following Rel-16 sidelink procedure for resource allocation mode 2. In step 2508, a determination is made as to whether the sidelink resource selected for the transmission of RSAI is to be re-evaluated. In certain embodiments, the evaluation can be optionally enabled or disabled by (pre-)configuration and/or can be activated or deactivated by higher layer signaling and/or L1 control signaling.

If the re-evaluated resource is not available, the controlling UE performs resource re-selection in step 2510 for the RSAI resource following the release 16 sidelink procedure for resource re-selection. If the re-evaluated resource is available, the controlling UE transmits RSAI in the selected resource, in step 2512.

In certain embodiments, (referred to as Example 6.5), there is no pre-reserved, pre-allocated, nor pre-determined resource for the transmission of RSAI. The resource for the transmission of RSAI can be selected following the resource selection procedure of sidelink, for example according to resource allocation mode 2. A slot n, as illustrated in FIG. 18, is (pre-)configured or indicated to a controlling UE. Once the resource for the transmission of RSAI is initially determined, i.e. in slot m, the RSAI is determined in slot n following the example of FIG. 18, wherein slot n is determined according to a time duration between slot m and slot n (i.e. $T'_3$) that can be (pre-)configured or calculated from other timing parameters. Slot m of the resource initially determined for the transmission of RSAI, before any re-evaluation, is used for the determination of slot n where the RSAI is determined even if a different slot is eventually used for the transmission of RSAI due to re-evaluation. The procedure for the determination and transmission of the RSAI by the controlling UE follows FIG. 22, where slot m is the slot of the initially determined resource for transmission of the RSAI before re-evaluation.

For example (denoted as Example 6.5.1), RSAI is determined only once when slot m corresponding to the initially selected resource for RSAI transmission is determined.

For another example (denoted as Example 6.5.2), RSAI is determined initially following example 6.3 or 6.4, (i.e. before the initially selected resource of RSAI is determined) and is updated or re-selected when slot m corresponding to the initially selected resource for RSAI transmission is determined.

For another example (denoted as Example 6.5.3), the operation of the system according to Example 6.5.1 or Example 6.5.2 can be (i) specified in the system specifications, (ii) (pre-)configured, (iii) updated by higher layer signaling (i.e. RRC signaling and/or MAC CE signaling), (iv) L1 control signaling, or (v) any combination thereof.

For yet another example (denoted as Example 6.5.4), the operation of the system according to Example 6.3 (or Example 6.4 as applicable), Example 6.5.1, or Example 6.5.2 can be (i) specified in the system specifications, (ii) (pre-)configured, (iii) updated by higher layer signaling (i.e. RRC signaling and/or MAC CE signaling), (iv) L1 control signaling, or (v) any combination thereof.

In certain embodiments, (referred to as Example 6.6), there is no pre-reserved nor pre-allocated nor pre-determined resource for the transmission of RSAI. The resource for the transmission of RSAI can be selected following the resource selection procedure of sidelink, for example according to resource allocation mode 2. Slot n, as illustrated in FIG. 18, is not (pre-)configured nor indicated to a controlling UE. Once the resource for the transmission of RSAI is initially determined, i.e. in slot m, the RSAI is determined according to slot m following the example of FIG. 18. The "sensing window for RSAI" and the "candidate window of RSAI" are determined relative to slot m. Slot m of the resource initially determined for the transmission of RSAI, before any re-evaluation, is used for the determination of RSAI even if a different slot is eventually used for the transmission of RSAI due to re-evaluation. The procedure for the determination and transmission of the RSAI by the controlling UE follows FIG. 23, where slot m is the slot of the initially determined resource for transmission of the RSAI before re-evaluation. In this example, slot n is not indicated to the UE, it is up to UE implementation to select a slot, or split the processing across multiple slots, for the determination of the RSAI.

For example (denoted as Example 6.6.1), RSAI is determined only once when slot m corresponding to the initially selected resource for RSAI transmission is determined.

For another example (denoted as Example 6.6.2), RSAI is determined initially following Example 6.3 or 6.4, (i.e. before the initially selected resource of RSAI is determined) and is updated or re-selected when slot m corresponding to the initially selected resource for RSAI transmission is determined.

For another example (denoted as Example 6.6.3), the operation of the system according to Example 6.6.1 or Example 6.6.2 can be (i) specified in the system specifications, (ii) (pre-)configured, (iii) updated by higher layer signaling (i.e. RRC signaling and/or MAC CE signaling), (iv) L1 control signaling, or (v) any combination thereof.

For yet another example (denoted as Example 6.6.3), the operation of the system according to Example 6.4 (or Example 6.3 as applicable), Example 6.6.1, or Example 6.6.2 can be (i) specified in the system specifications, (ii) (pre-)configured, (iii) updated by higher layer signaling (i.e. RRC signaling and/or MAC CE signaling), (iv) L1 control signaling, or (v) any combination thereof.

In certain embodiments, (referred to as Example 6.7), there is no pre-reserved nor pre-allocated nor pre-determined resource for the transmission of RSAI. The resource for the transmission of RSAI can be selected following the resource selection procedure of sidelink, for example according to resource allocation mode 2. A slot n, as illustrated in FIG. 18, is (pre-)configured or indicated to a controlling UE. Once the resource for the transmission of RSAI is finally determined after all re-evaluations, (i.e. in slot m which is the slot actually used to transmit RSAI), the RSAI is determined in slot n following the example of FIG. 18, wherein slot n is determine according to a time duration between slot m and slot n (i.e. $T'_3$) that can be (pre-) configured or calculated from other timing parameters. Slot m which includes the resource used for RSAI transmission after resource selection and all resource re-evaluations and re-selections, is used for the determination of slot n. The procedure for the determination and transmission of the RSAI by the controlling UE follows FIG. 22, where slot m is the slot including the resource eventually used for transmission of the RSAI.

For example (denoted as Example 6.7.1), RSAI is determined only once when slot m corresponding to the resource used for RSAI transmission is determined.

For another example (denoted as Example 6.7.2), RSAI is determined when slot m corresponding to the initially selected resource for RSAI transmission is determined, RSAI is updated or re-selected as slot m is re-evaluated and a new slot for RSAI transmission is determined.

For another example (denoted as Example 6.7.3), RSAI is determined initially following Example 6.3 or 6.4, i.e. before the initially selected resource of RSAI is determined and is updated or re-selected when slot m corresponding to the resource used for RSAI transmission is determined.

For another example (denoted as Example 6.7.4), RSAI is determined initially following Example 6.3 or 6.4, (i.e. before the initially selected resource of RSAI is determined) and is updated or re-selected when slot m corresponding to the initially selected resource for RSAI transmission is determined, RSAI is updated or re-selected as slot m is re-evaluated and a new slot for RSAI transmission is determined.

For another example (denoted as Example 6.7.5), the operation of the system according to Example 6.7.1, Example 6.7.2, Example 6.7.3, or Example 6.7.4 can be (i) specified in the system specifications, (ii) (pre-)configured, (iii) updated by higher layer signaling (i.e. RRC signaling and/or MAC CE signaling), (iv) L1 control signaling, or (v) any combination thereof.

For yet another example (denoted as Example 6.7.6), the operation of the system according to Example 6.3 (or Example 6.4 as applicable), Example 6.5.1, Example 6.5.2, Example 6.7.1, Example 6.7.2, Example 6.7.3, or Example 6.7.4 can be (i) specified in the system specifications, (ii) (pre-)configured, (iii) updated by higher layer signaling (i.e. RRC signaling and/or MAC CE signaling), (iv) L1 control signaling, or (v) any combination thereof.

In certain embodiments, (referred to as Example 6.8), there is no pre-reserved nor pre-allocated nor pre-determined resource for the transmission of RSAI. The resource for the transmission of RSAI can be selected following the resource selection procedure of sidelink, for example according to resource allocation mode 2. Slot n, as illustrated in FIG. 18, is not (pre-)configured nor indicated to a controlling UE. Once the resource for the transmission of RSAI is finally determined, (i.e. in slot m which is the slot actually used to transmit RSAI), the RSAI is determined according to slot m following the example of FIG. 18, wherein the "sensing window for RSAI" and the "candidate window of RSAI" are determined relative to slot m. Slot m which includes the resource used for RSAI transmission after resource selection and all resource re-evaluations and re-selections is used for the determination of RSAI. The procedure for the determination and transmission of the RSAI by the controlling UE follows FIG. 23, where slot m is the slot including the resource eventually used for transmission of the RSAI. In this example, slot n is not indicated to the UE, it is up to UE implementation to select a slot, or split the processing across multiple slots, for the determination of the RSAI.

For example (denoted as Example 6.8.1), RSAI is determined only once when slot m corresponding to the resource used for RSAI transmission is determined.

For another example (denoted as Example 6.8.2), RSAI is determined when slot m corresponding to the initially selected resource for RSAI transmission is determined, RSAI is updated or re-selected as slot m is re-evaluated and a new slot for RSAI transmission is determined.

For another example (denoted as Example 6.8.3), RSAI is determined initially following example 6.3 or 6.4, (i.e. before the initially selected resource of RSAI is determined) and is updated or re-selected when slot m corresponding to the resource used for RSAI transmission is determined.

For another example (denoted as Example 6.8.4), RSAI is determined initially following example 6.3 or 6.4, (i.e. before the initially selected resource of RSAI is determined) and is updated or re-selected when slot m corresponding to the initially selected resource for RSAI transmission is determined, RSAI is updated or re-selected as slot m is re-evaluated and a new slot for RSAI transmission is determined.

For another example (denoted as Example 6.8.5), the operation of the system according to Example 6.8.1, Example 6.8.2, Example 6.8.3, or Example 4.8.4 can be (i) specified in the system specifications, (ii) (pre-)configured, (iii) updated by higher layer signaling (i.e. RRC signaling and/or MAC CE signaling), (iv) L1 control signaling, or (v) any combination thereof.

For yet another example (denoted as Example 6.8.6), the operation of the system according to Example 6.4 (or Example 6.3 as applicable), Example 6.6.1, Example 6.6.2, Example 6.8.1, Example 6.8.2, Example 6.8.3, or Example 6.8.4 can be (i) specified in the system specifications, (ii) (pre-)configured, (iii) updated by higher layer signaling (i.e. RRC signaling and/or MAC CE signaling), (iv) L1 control signaling, or (v) any combination thereof.

Although FIGS. 22-25 illustrates example methods, various changes may be made to FIGS. 22-25. For example, while methods 2200, 2300, 2400, and 2500 are shown as a series of steps, various steps could overlap, occur in parallel, occur in a different order, or occur multiple times. In another example, steps may be omitted or replaced by other steps. For example, steps of the methods 2200, 2300, 2400, and 2500 can be executed in a different order.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive a physical sidelink (SL) control channel (PSCCH) or a physical SL shared channel (PSSCH) on a SL interface; and
a processor operably coupled to the transceiver, the processor configured to:
perform a first sensing of the SL interface, and
determine first information, based on the first sensing, for selection of a first SL resource at a second UE,
wherein the transceiver is further configured to transmit the first information to the second UE, and
wherein the first information includes at least one of:
available resources for the first SL resource selection at the second UE, and
unavailable resources for the first SL resource selection at the second UE.

2. The UE of claim 1, wherein:
the transceiver is further configured to receive a configuration for a set of SL resources, and
the first SL resource is from the set of SL resources.

3. The UE of claim 1, wherein:
the first SL resource is activated for transmission of a first SL channel based on one of:
after pre-configuration or configuration by higher layers,
by a medium access control (MAC) control element (CE), and
by physical layer control signaling; and
the first SL resource is activated for one of:
a predetermined number of transmission occasions,
a configured time period, and
remains activated until deactivated.

4. The UE of claim 1, wherein:
the transceiver is further configured to receive an indication to transmit a first SL channel with the first information; and
the processor is further configured to, in response to the indication, one of:
perform the first sensing of the SL interface and provide the first information to the transceiver, and
provide the first information to the transceiver.

5. The UE of claim 1, wherein the first information includes at least one of:
available resources for the first SL resource selection,
unavailable resources for the first SL resource selection,
undetermined resources for the first SL resource selection, and
a SL reference signal received power (RSRP) threshold for determination of resources available for the first SL resource selection.

6. The UE of claim 1, wherein the transceiver is further configured to multiplex in a first SL channel, at least one of:
a location for the UE,
an indication of a second SL resource for transmission of a second SL channel with second information for a second SL resource selection, and
an indication of SL resources used by a third UE to transmit a third SL channel with third information for third SL resource selection.

7. The UE of claim 1, wherein the processor is further configured to:
select the first SL resource, and
determine the first information based on one of:
a slot where the processor selects the first SL resource for transmission of a first SL channel, and
a slot where the transceiver transmits the first SL channel.

8. The UE of claim 7, wherein the processor is further configured to:
re-select the first SL resource based on a second sensing for at least one of:
a re-evaluation check for the first SL resource, and
a preemption check for the first SL resource; and
re-determine the first information for the first SL resource selection based on a third sensing.

9. A user equipment (UE), comprising:
a transceiver configured to receive first information for selection of a first sidelink (SL) resource from a first UE, wherein the first information includes at least one of:
available resources for the first SL resource selection at the UE, and
unavailable resources for the first SL resource selection at the UE; and
a processor operably connected to the transceiver, the processor configured to:
determine an applicability of the first information, and
select a second SL resource based on the first information when the first information is determined to be applicable,
wherein the transceiver is further configured to transmit a second SL channel on the second SL resource.

10. The UE of claim 9, wherein the processor is further configured to:
perform a sensing of an SL interface, and
select the second SL resource further based on the sensing.

11. The UE of claim 9, wherein:
the first SL resource is activated for reception based on one of:
after pre-configuration or configuration by higher layers,
by a medium access control (MAC) control element (CE), and
by physical layer control signaling; and
the first SL resource is activated for one of:
a predetermined number of reception occasions,
a configured time period, and
remains activated until deactivated.

12. The UE of claim 9, wherein the transceiver is further configured to:
transmit a third SL channel that includes a request for the first information, and
receive a first SL channel in response to the request.

13. The UE of claim 9, wherein the first information includes at least one of:
available resources for the selection of the second SL resource,
unavailable resources for the selection of the second SL resource,
undetermined resources for the selection of the second SL resource,
a SL reference signal received power (RSRP) threshold for determination of resources available for the selection of the second SL resource, a location of the first UE providing the first information, an indication of a third SL resource for transmission of a third SL channel with a second information for the selection of the second SL resource, and an indication of a fourth SL resource used by a second UE to transmit a fourth SL channel with a third information for the selection of the second SL resource.

14. The UE of claim 9, wherein:

the transceiver is further configured to receive information for at least one of:

a distance threshold, a SL reference signal received power (RSRP) threshold, and a pathloss threshold; and the processor is further configured to determine the applicability of the first information based on at least one of:

a distance between the UE and the first UE relative to the distance threshold, a SL reference signal received power (RSRP) of a first SL channel relative to the SL RSRP threshold, and a pathloss between the UE and the first UE relative to the pathloss threshold.

15. The UE of claim 9, wherein:

the transceiver is further configured to receive the second SL channel from a second UE, wherein the second SL channel includes second information; and the processor is further configured to select the second SL resource from the first information or the second information based on at least one of:

a first distance between the UE and the first UE and a second distance between the UE and the second UE, a first SL reference signal received power (RSRP) of a first SL channel and a second SL RSRP of the second SL channel, and a first pathloss between the UE and the first UE and a second pathloss between the UE and the second UE.

16. The UE of claim 9, wherein:

a first SL channel is received;

the transceiver is further configured to receive the second SL channel from a second UE;

the first and second SL channels include at least first and second available resources for SL resource selection in first and second resource selection windows, respectively, that overlap at least partially in time; and the processor is further configured to determine available resources for the second SL resource selection based on resources from at least one of:

the first available resources that do not overlap in time with the second resource selection window, the second available resources that do not overlap in time with the first resource selection window, an intersection of the first available resources and the second available resources that overlap in time, and a union of the first available resources and the second available resources that overlap in time.

17. The UE of claim 9, wherein:

a first SL channel is received;

the transceiver is further configured to receive the second SL channel from a second UE, wherein the first and second SL channels include first and second information that at least provide, respectively:

first and second available SL resources, and first and second undetermined SL resources; and the processor is further configured to determine available resources for the second SL resource selection based on one of:

a SL resource that is indicated in both the first and second available SL resources, and a SL resource that is indicated in the first available SL resources and in the second undetermined SL resources or indicated in the second available SL resources and in the first undetermined SL resources.

18. A method of operating a user equipment (UE), the method comprising:

receiving first information for selection of a first sidelink (SL) resource from a first UE, wherein the first information includes at least one of:

available resources for the first SL resource selection at the UE, and unavailable resources for the first SL resource selection at the UE;

determining an applicability of the first information;

selecting a second SL resource based on the first information when the first information is determined to be applicable; and transmitting a second SL channel on the second SL resource.

19. The method of claim 18, further comprising:

performing a sensing of an SL interface; and selecting the second SL resource further based on the sensing.

20. The method of claim 18, further comprising:

transmitting a third SL channel that includes a request for the first information, and receiving a first SL channel in response to the request.

\* \* \* \* \*